Jan. 20, 1959  L. C. KAHLE  2,869,285
APPARATUS FOR SHAPING GLASS ARTICLES
Filed July 30, 1952  16 Sheets-Sheet 1

INVENTOR.
Louis C. Kahle
BY
Norman L. Holland
ATTORNEY

Jan. 20, 1959     L. C. KAHLE     2,869,285
APPARATUS FOR SHAPING GLASS ARTICLES
Filed July 30, 1952     16 Sheets-Sheet 2

INVENTOR.
Louis C. Kahle
BY
Norman L. Holland
ATTORNEY

Jan. 20, 1959 L. C. KAHLE 2,869,285
APPARATUS FOR SHAPING GLASS ARTICLES
Filed July 30, 1952 16 Sheets-Sheet 4

Fig. 6

INVENTOR.
Louis C. Kahle
BY
Norman L. Holland
ATTORNEY

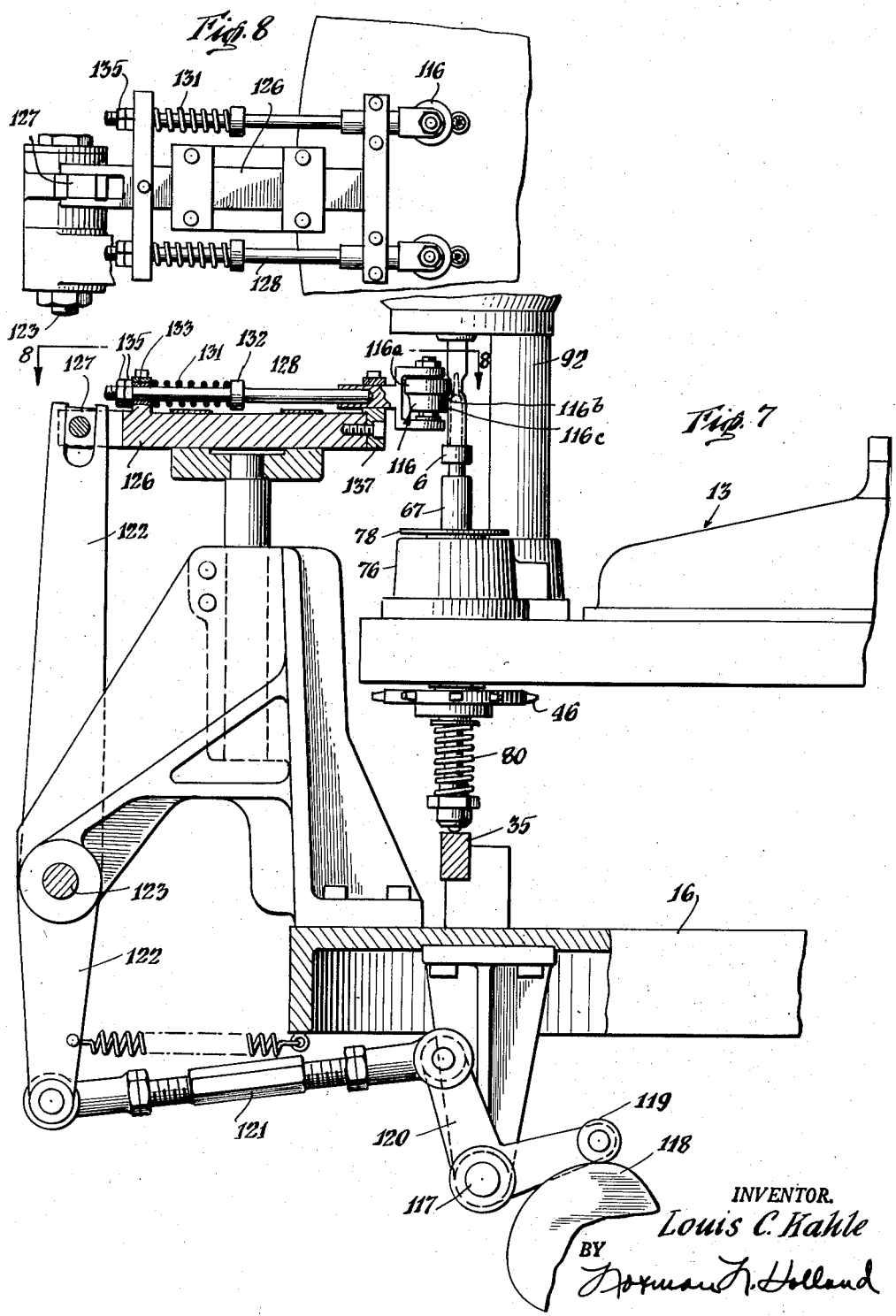

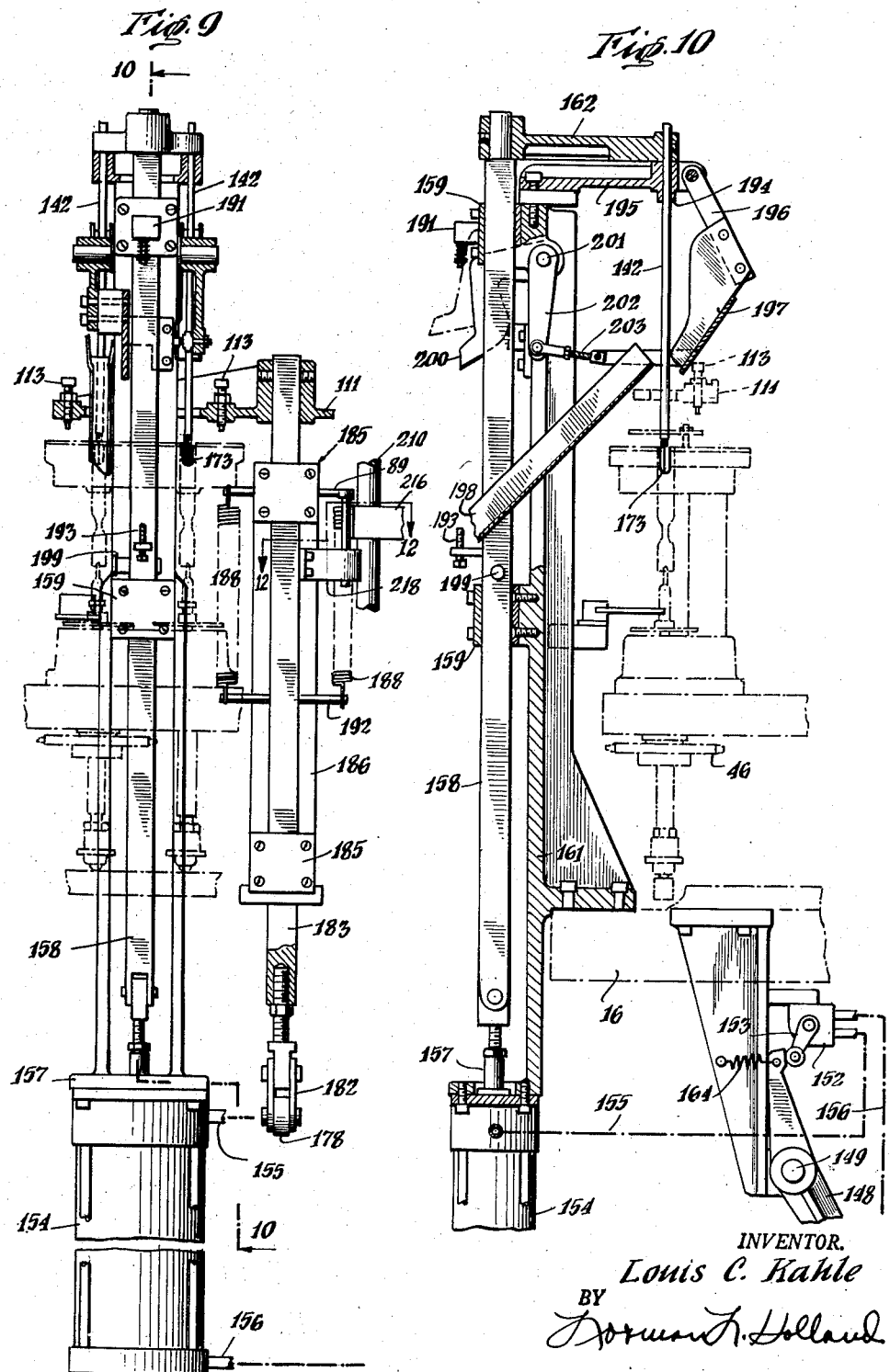

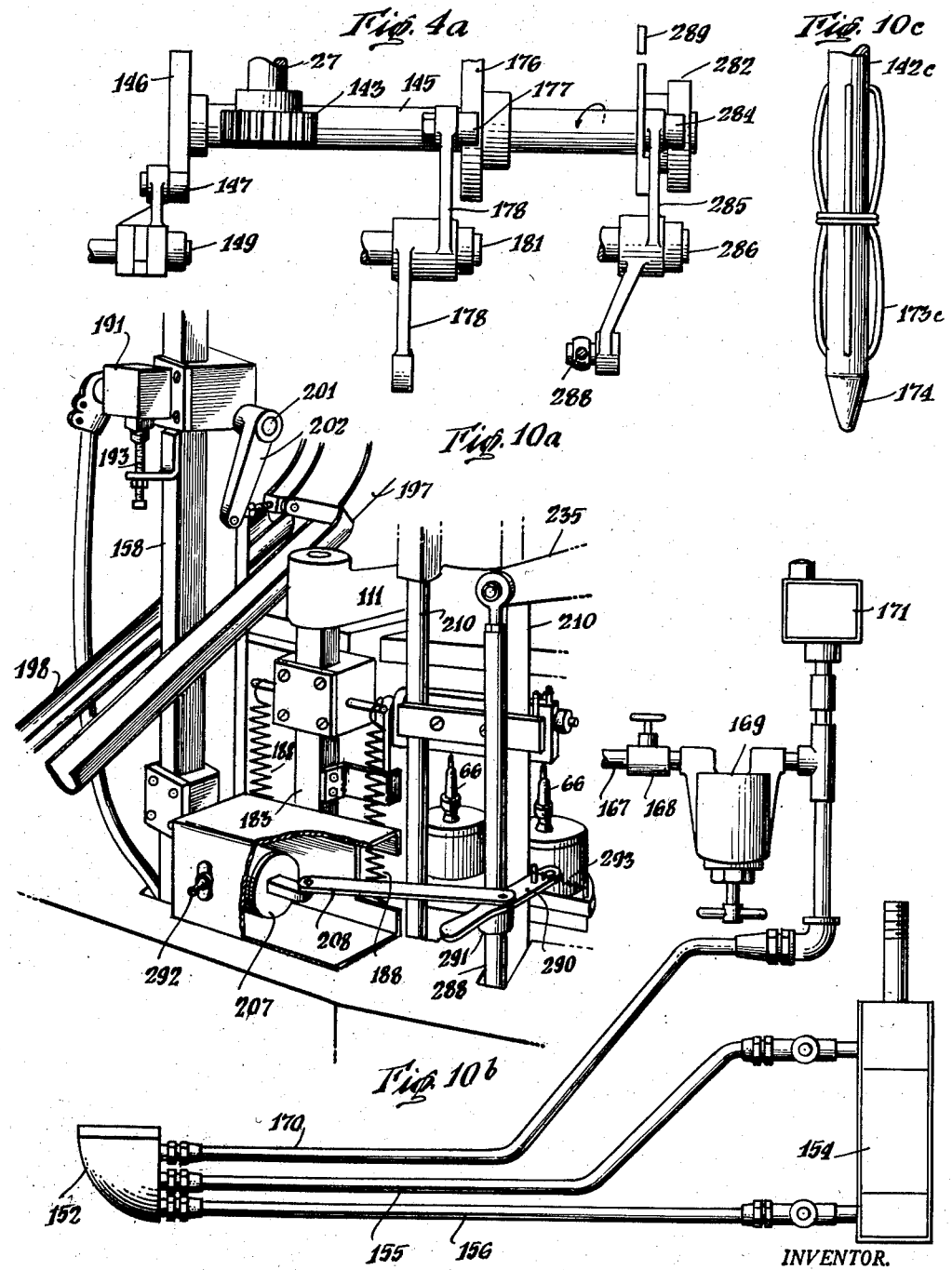

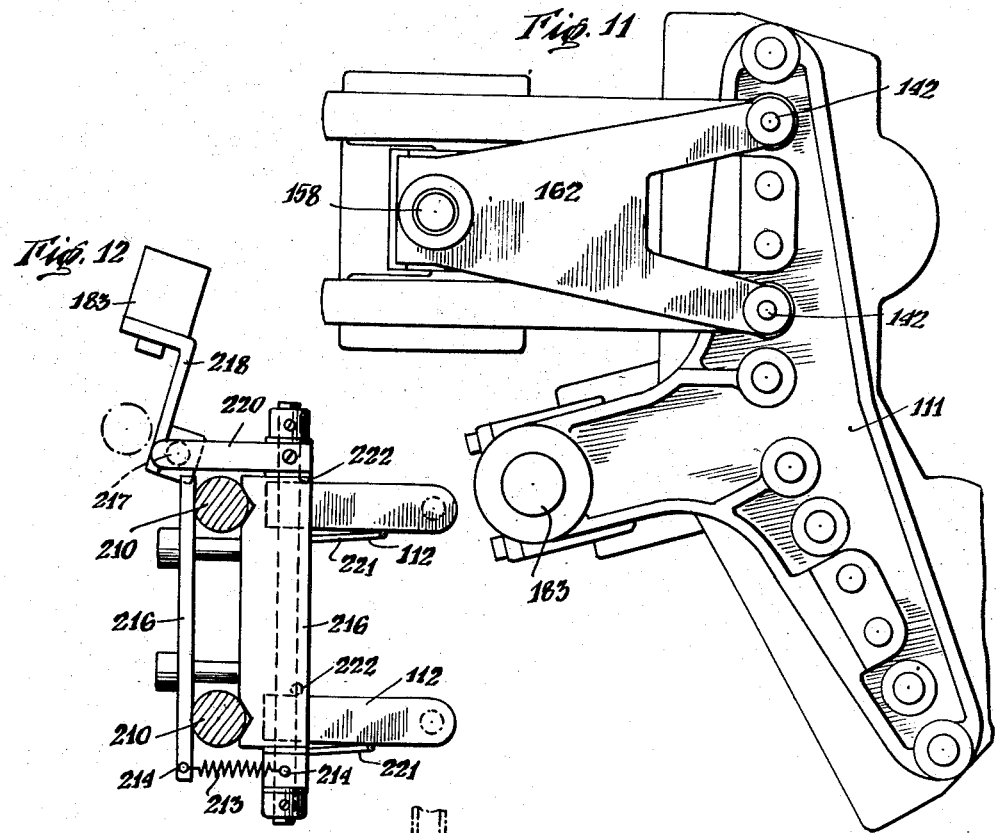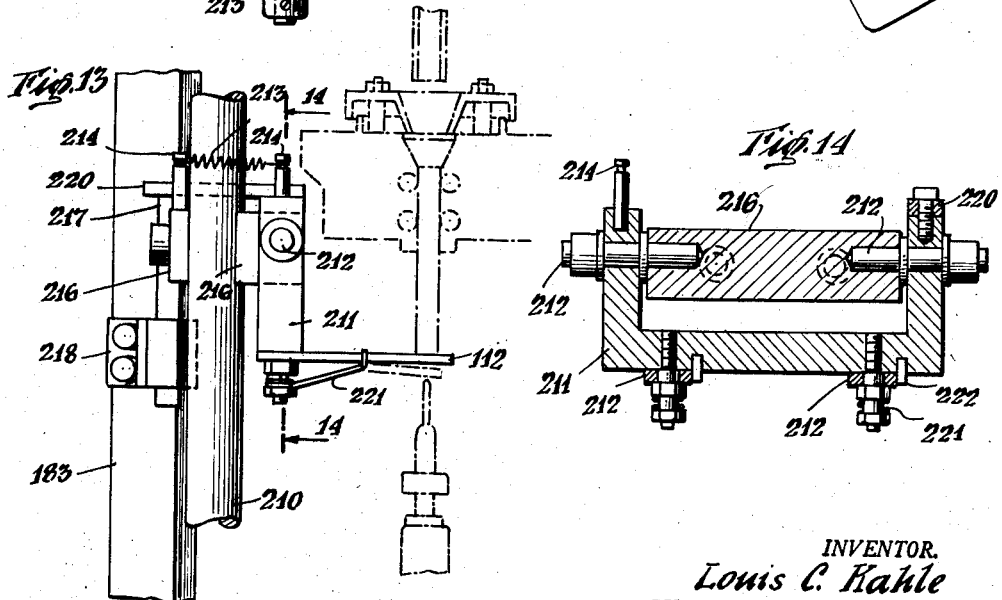

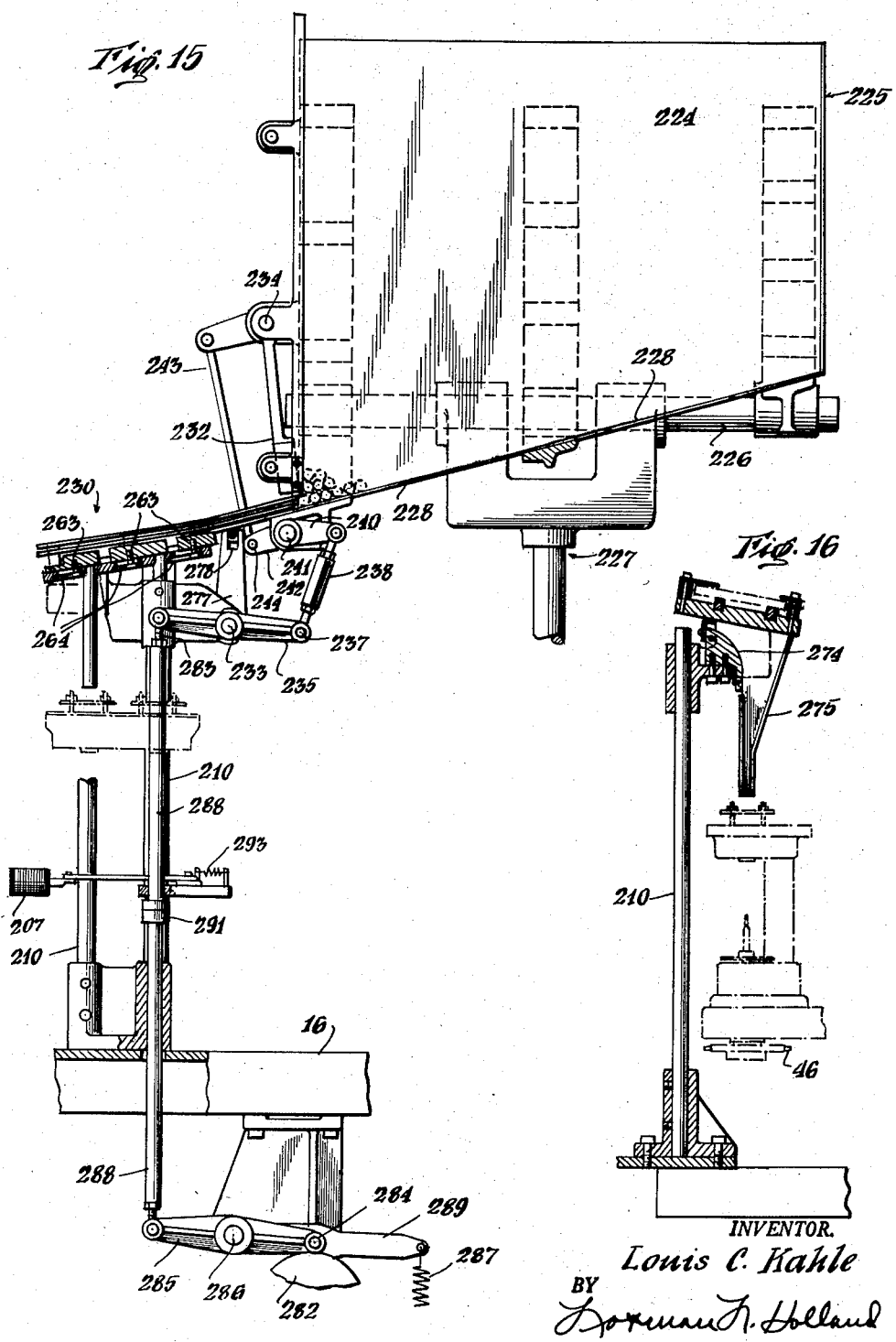

Jan. 20, 1959 L. C. KAHLE 2,869,285
APPARATUS FOR SHAPING GLASS ARTICLES
Filed July 30, 1952 16 Sheets-Sheet 10
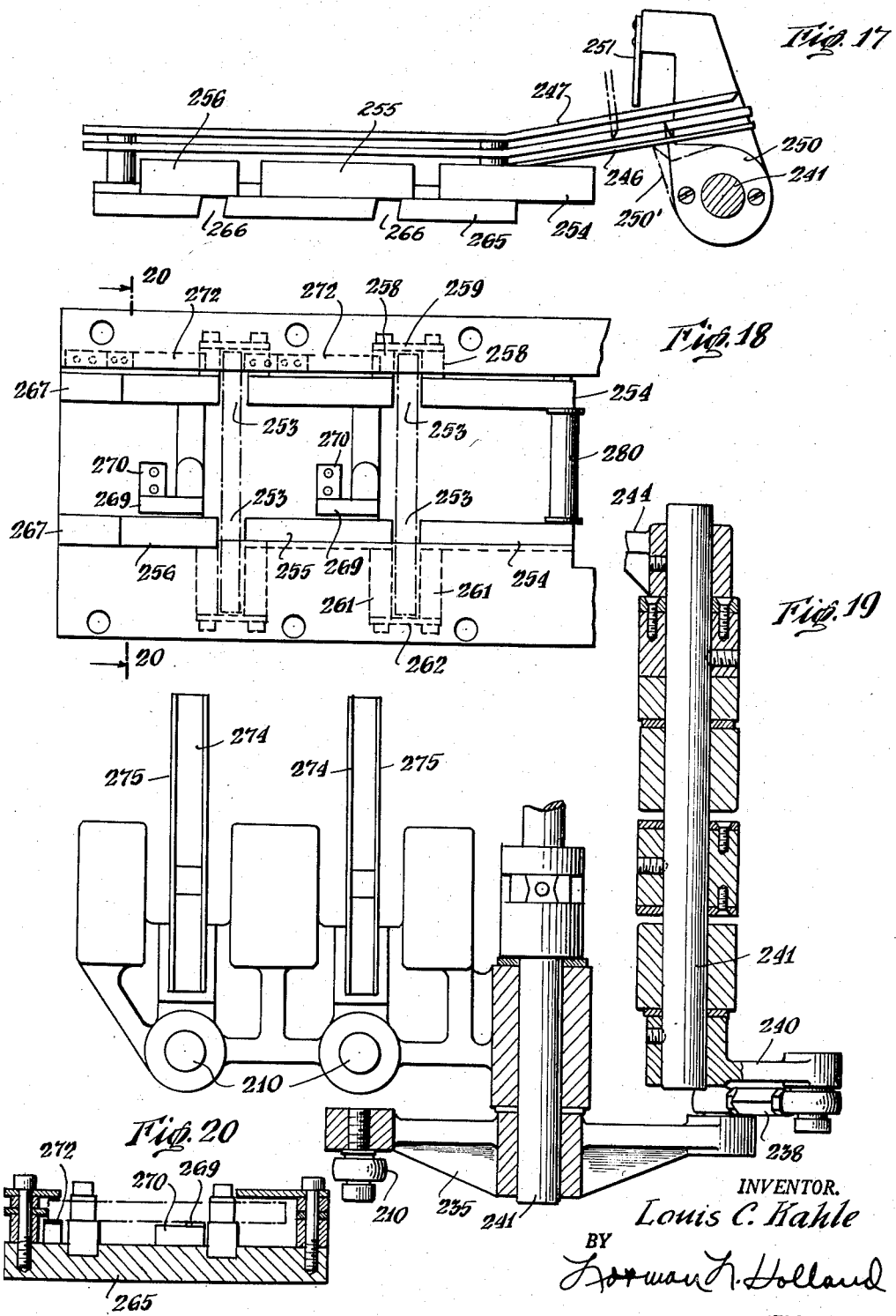
INVENTOR.
Louis C. Kahle
BY
Norman L. Holland
ATTORNEY

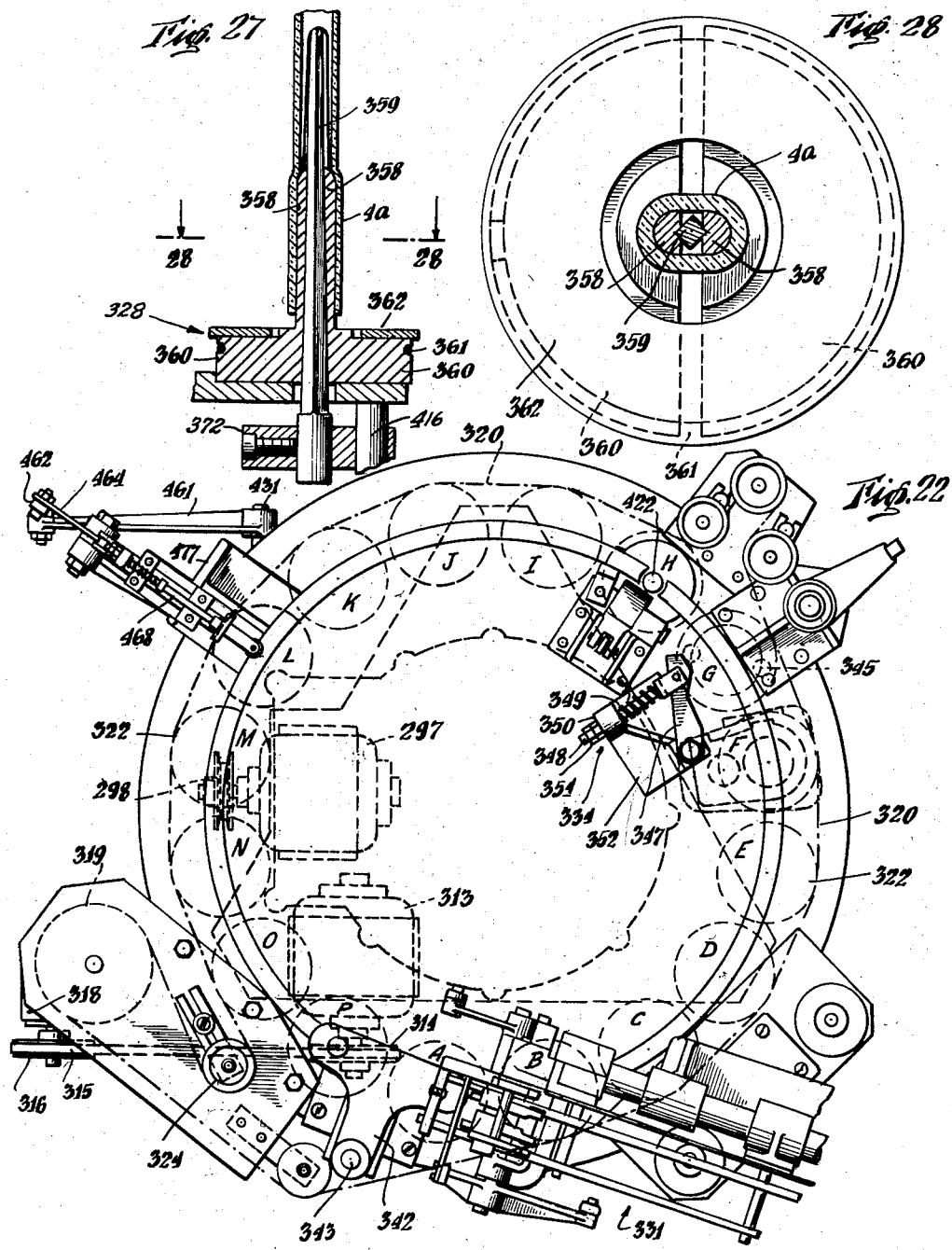

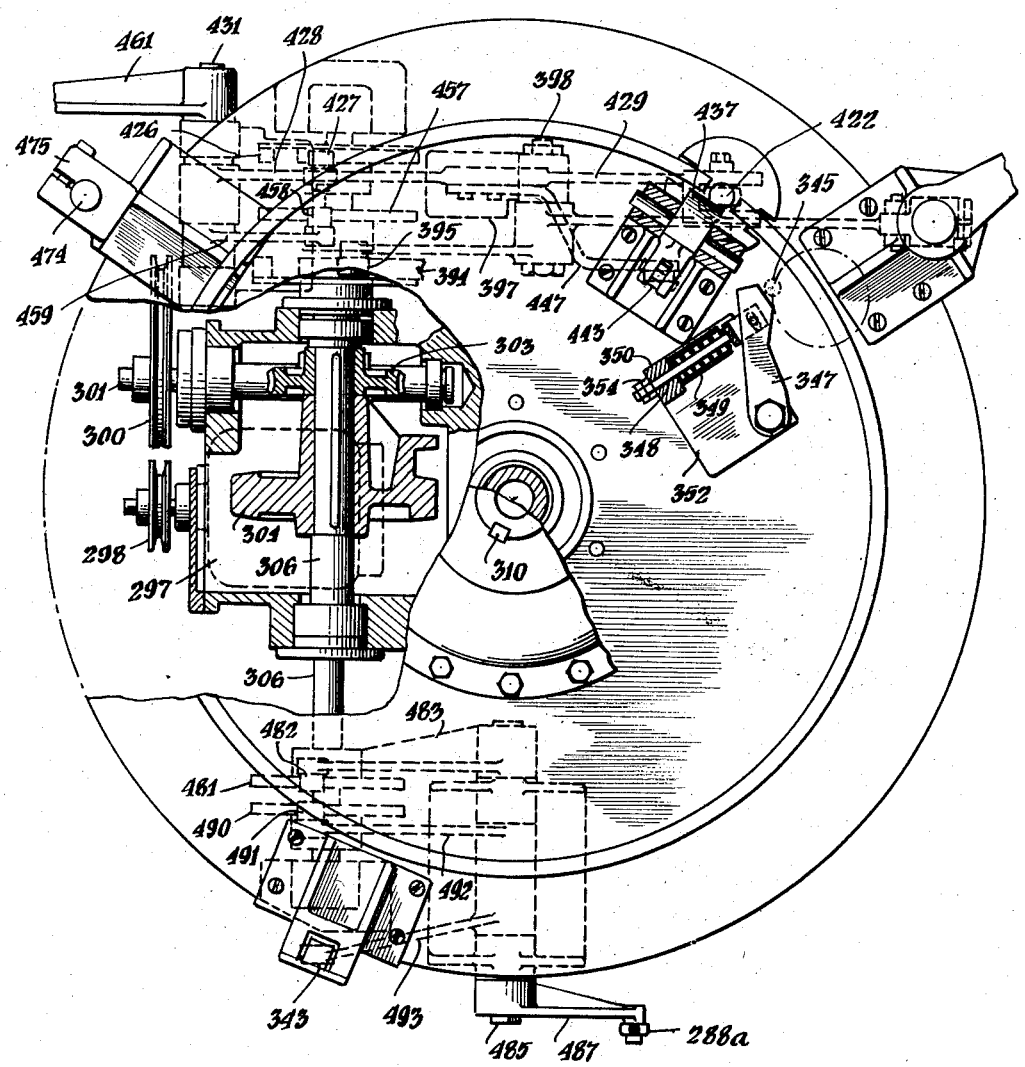

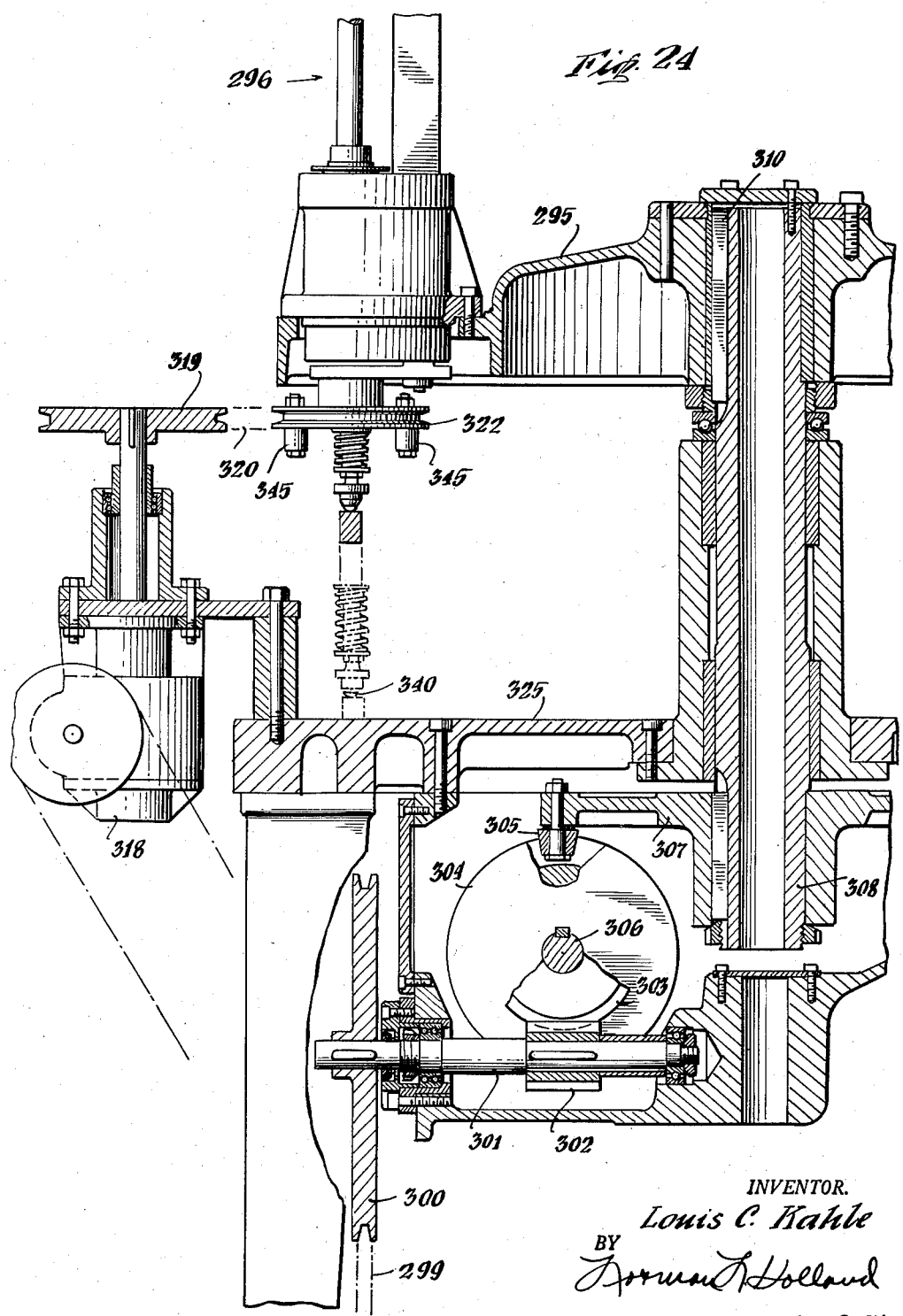

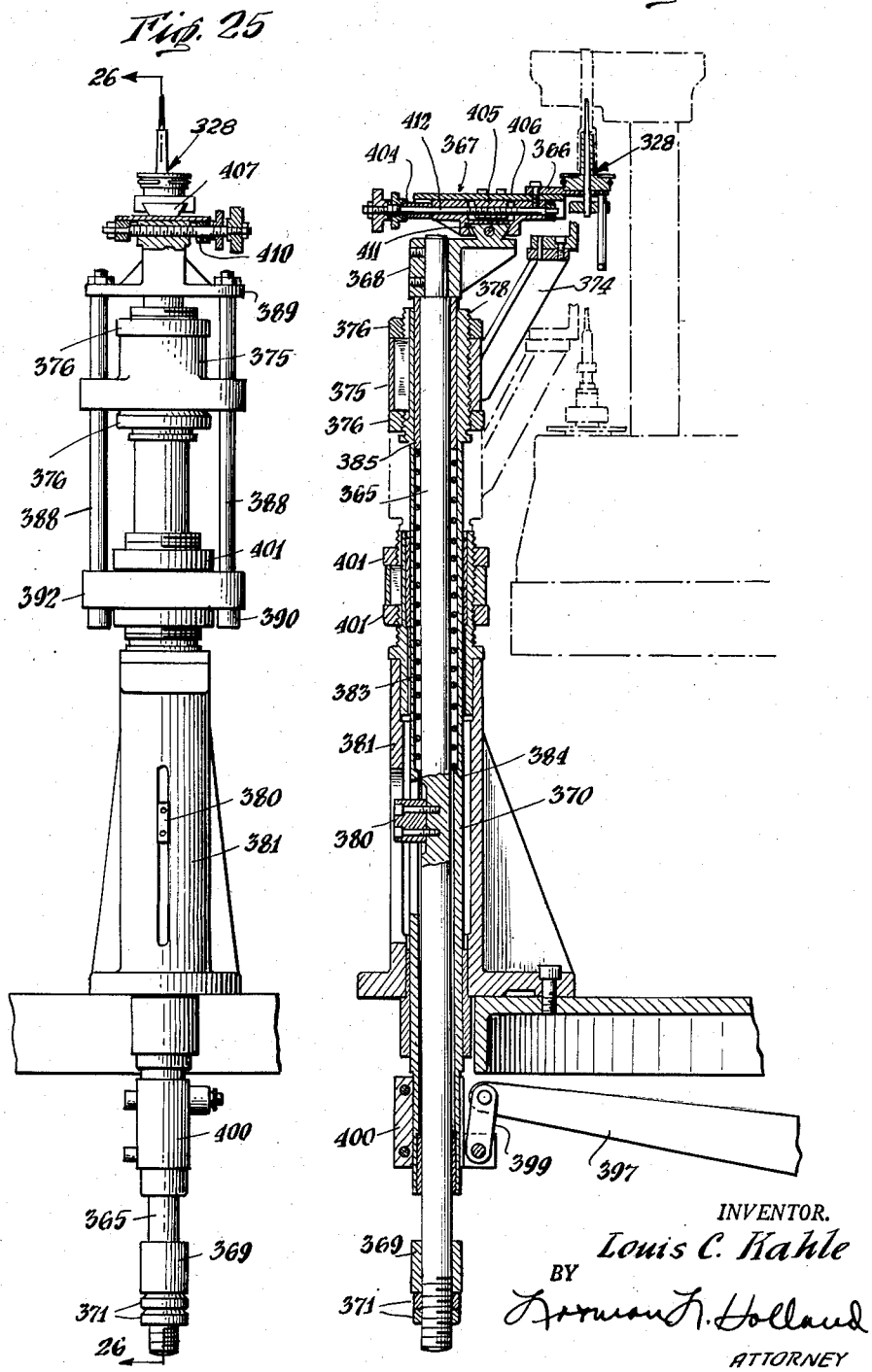

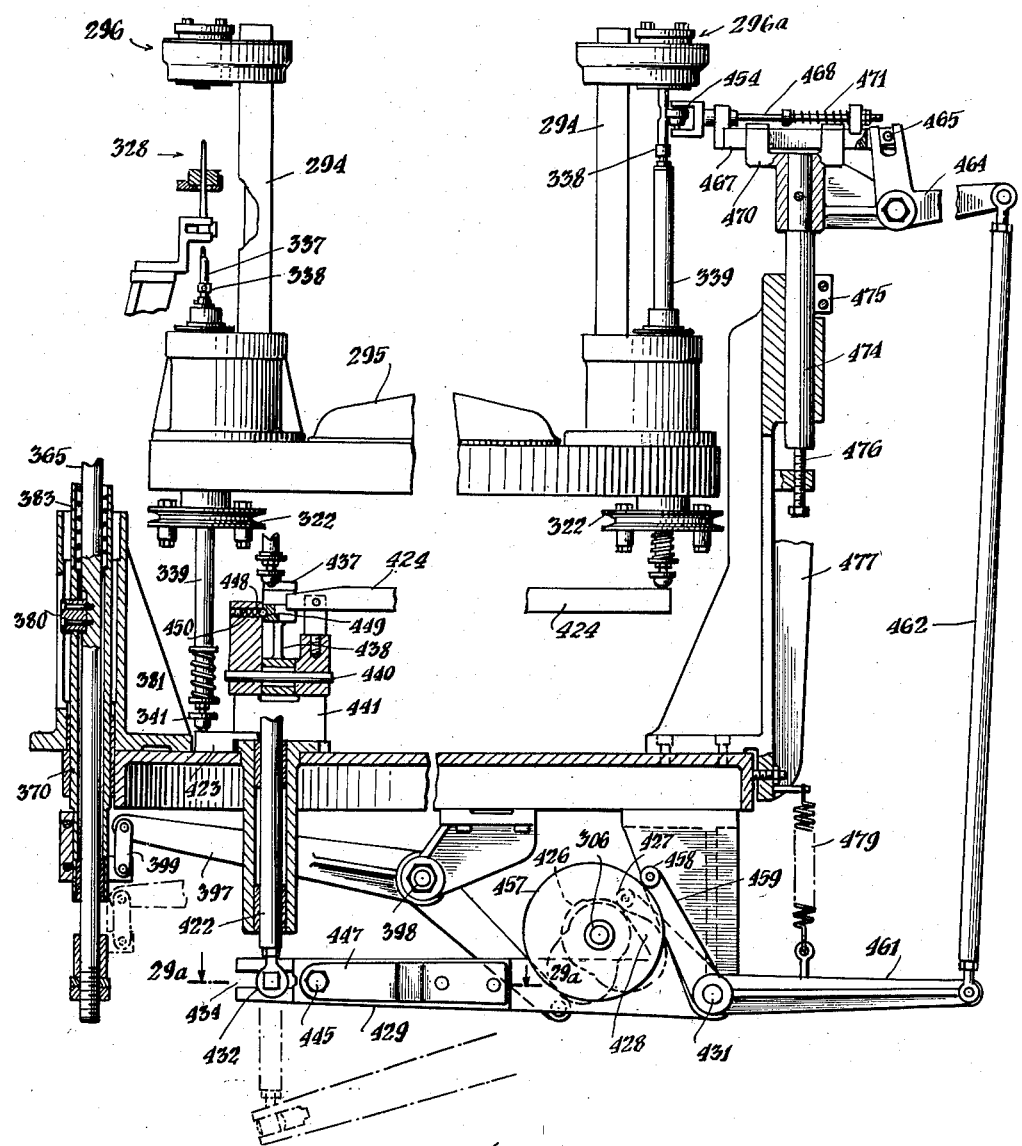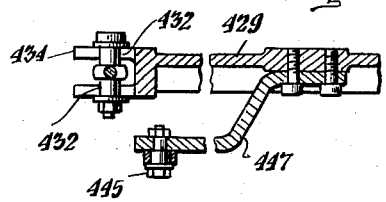

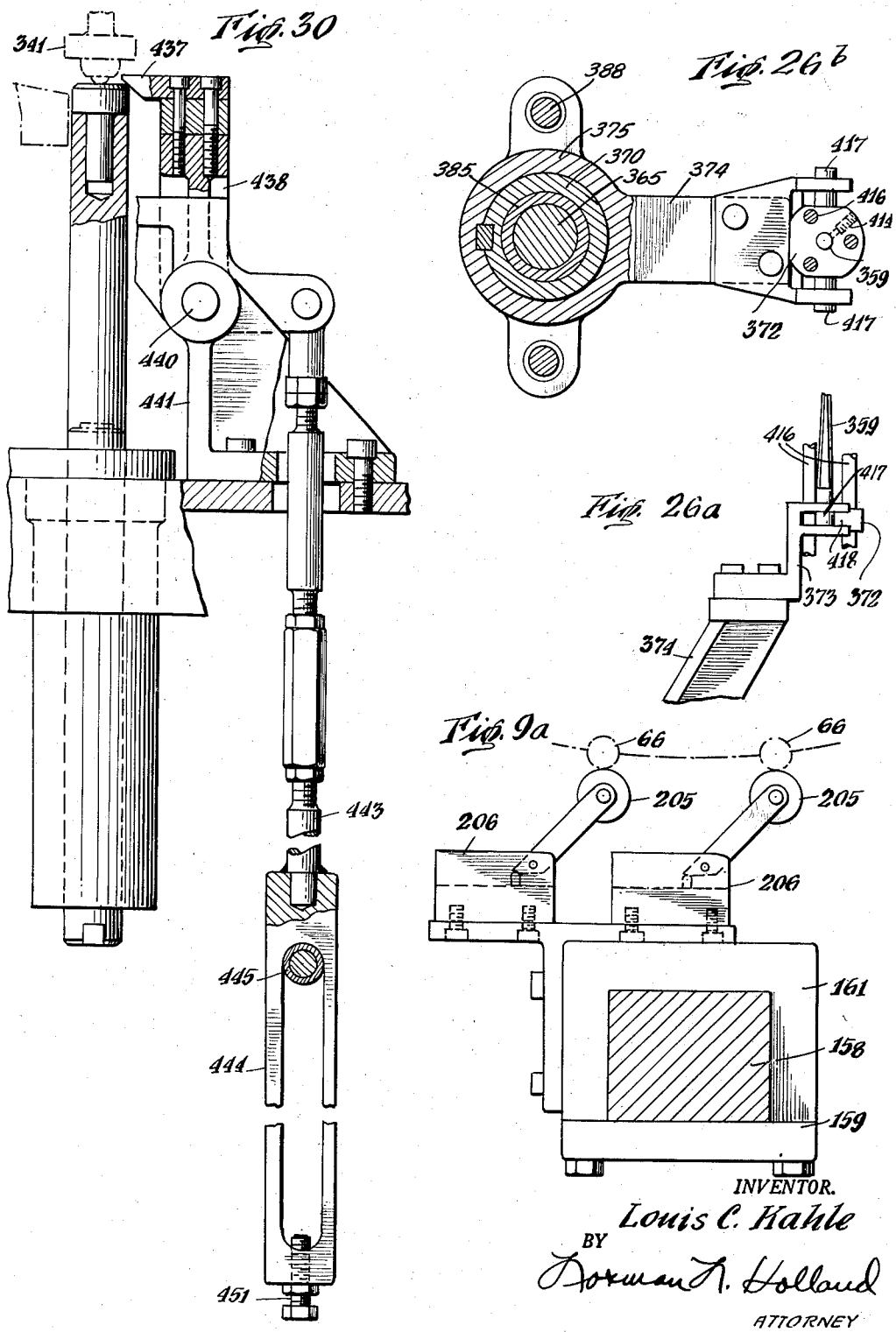

United States Patent Office 2,869,285
Patented Jan. 20, 1959

2,869,285

APPARATUS FOR SHAPING GLASS ARTICLES

Louis C. Kahle, Teaneck, N. J., assignor to Kahle Engineering Company, North Bergen, N. J., a copartnership Application July 30, 1952, Serial No. 301,721

13 Claims. (Cl. 49—7)

The present invention relates generally to the manufacture of articles from glass tubing. More particularly it relates to the reforming of cylindrical lengths of glass tubing into hollow articles embodying a pair of spaced portions of comparatively large interior cross sectional dimension joined together by an integral intermediate portion of comparatively small interior cross sectional dimension; the intermediate portion and at least one of the larger portions are accurately shaped and provided with predetermined interior cross section dimension.

Glass articles produced by the present apparatus are used as enclosures for electrical equipment such as that used in radio amplifier tubes, and particularly for sub-miniature tubes that are used in very small size electronic equipment. With such electronic equipment it is highly important that the interior cross sectional dimensions of the reformed tubing lengths at one of the larger portions be accurately and uniformly formed so that portions of an inserted electric unit firmly engage the walls of the article to hold the unit in position against movement; if the inserted unit is free to move in any direction within its enclosing glass shell electric disturbances, known as "microphonics," are set up when the completed device is utilized in electronic equipment. For best results in holding an electrical unit firmly and accurately in position within the glass enclosure, the interior walls of the unit-receiving portion of the article are tapered so that mica or other discs carried by the unit may frictionally and firmly engage the walls as the unit is inserted.

After the electrical unit has been inserted the open unit-entrance end is closed and sealed in air tight manner against electrical conductors which are to protrude to the outside of the article. The open end of the oppositely disposed relatively large dimension portion of the glass article is thereafter connected with means for exhausting air. In this operation air leaves the now sealed unit-enclosing glass portion through the intermediate relatively small diameter portion and through the integral larger diameter glass portion. The small diameter portion may be readily sealed off when sufficient air has been exhausted. This sealing or tipping is done automatically using a tipping torch to melt the glass. Uniform wall thickness in the small diameter portion of the tube is necessary because the tipping off torch operates for a fixed time interval. When the wall is too thin, the wall becomes too fluid and is sucked in by the vacuum and, when the wall is too thick, the tip is not fluid enough to seal itself.

The small diameter portion is of relatively short length and hence there is minimum impedance to withdrawal of the air; the integral larger glass portion facilitates withdrawal of air with minimum resistance and hence air may be rapidly and substantially completely withdrawn from the glass end portion which contains the electrical unit.

Under former practice it was necessary to join a relatively large diameter glass bulb with a long glass tube by directing a flame jet against the bottom of the tube so as to melt a hole through it, portions of the tube and bulb being then melted together so that the tube could serve as a conduit for withdrawing air. While this method may be used with bulbs and tubing of relatively large diameter, it is not practicable where the device to be manufactured is of sub-miniature size for use in electrical equipment of guided missiles, proximity fuses, etc. If it is attempted to make the bulb sufficiently small for such uses that method cannot be utilized as it is a physical impossibility as a practical matter, to insert a flame jet nozzle down inside the bulb so as to melt a hole through the bulb wall for joining it with a tube. In addition, this previous method lacks the exactly formed and uniform cross sectional dimensions of the present invention.

It has been attempted to produce a suitable small glass enclosure for electrical equipment by joining together two lengths of glass tubing, one length being sufficiently large to contain the electrical unit and the other being of small diameter to permit withdrawal of air subsequent to insertion and rapid sealing of the electrical unit into the larger portion of the glass article. This latter method is objectionable as it does not provide a uniform thickness or strength joint and there is no accurate inside diameter which may receive and hold the electrical unit of the inserted device; the tubing from which the larger cross sectional portion of such an article was manufactured is not generally of sufficiently accurate interior dimension to firmly engage and accurately position the electrical unit so as to prevent objectionable microphonics.

A further objection to the method of joining together separate lengths of glass tubing is that there is a large amount of spoilage when it is done on automatic machinery. This is a very serious objection, as recourse to hand manufacture increases the time and cost to such an extent as to make it prohibitive.

The apparatus of the present invention aims to overcome the above and other difficulties by transforming generally cylindrical lengths of glass tubing into a shape having a first comparatively large interior cross section of very accurately formed and preferably tapering internal dimension for receiving an electrical unit, a small reduced diameter accurately dimensioned hollow section for exhausting air from the first enlarged portion and having a second large diameter portion for facilitating rapid and thorough withdrawal of air through the reduced section from the first large portion of the glass article. In addition, the present invention contemplates the provision of a new apparatus for producing very accurately dimensioned glass articles automatically at relatively high rates of speed and for reforming cylindrical lengths of glass tubing to provide portions with very accurately dimensioned interior surfaces and wall thickness, which portions may be of either circular or rectangular cross section.

Another object of the invention is to provide new and improved apparatus for reforming lengths of glass tubing.

Another object of the invention is to provide new and improved apparatus for reforming lengths of glass tubing accurately to predetermined interior dimensions and wall thickness.

Another object of the invention is to provide new and improved apparatus for transforming substantially cylindrical lengths of tubing to articles having a pair of spaced portions integral with and connecting by an intermediate portion of reduced cross sectional dimension.

Another object of the invention is to provide new and improved apparatus for manufacture of glass articles which is of relatively sturdy and foolproof construction.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Figs. 1, 2, and 3 illustrate in a general way method steps employed in reforming a length of glass tubing into an article having a pair of spaced enlarged portions joined by an intermediate portion of reduced cross section;

Fig. 4a is a fragmentary top plan view showing a portion of the driving mechanism of the machine illustrated in Fig. 4;

Fig. 5a is a fragmentary elevational view, partly in section, showing a portion of means for rotating the chucks and mandrels of the machine;

Fig. 6 is a vertical sectional view, taken along line 6—6 of Fig. 4, showing the chucks and mandrel means;

Fig. 7 is a fragmentary elevational view taken along line 7—7 of Fig. 4, and showing means for pressing against and shaping lengths of glass tubing held by the chucks and mandrels;

Fig. 8 is a top plan view taken along line 8—8 of Fig. 7;

Fig. 9 is a fragmentary elevational view, partly in section, showing means for opening the chucks and for removing articles from the chucks;

Fig. 9a is a fragmentary horizontal view showing means for indicating when pieces of broken glass remain on the mandrels;

Fig. 10 is a sectional view taken along line 10—10 of Fig. 9;

Fig. 10a is a perspective showing the relationship of various elements of the machine adjacent the unloading and loading stations;

Fig. 10b is a view showing portions of means for removing articles from the chucks;

Fig. 10c is a fragmentary view of a modified form of tube removing rod;

Fig. 11 is a top plan view showing portions of the chuck opening means and the means for removing articles from the chucks;

Fig. 12 is a fragmentary horizontal sectional view taken along line 12—12 of Fig. 9, showing means for initially supporting lengths of glass tubing delivered to the chucks;

Fig. 13 is a fragmentary side elevational view of the means illustrated in Fig. 12;

Fig. 14 is a sectional view taken along line 14—14 of Fig. 13;

Fig. 15 is an elevational view illustrating means for delivering and releasing lengths of glass tubing to the chucks;

Fig. 16 is a vertical sectional view illustrating the relationship of the chucks and guide for presenting lengths of glass tubing;

Fig. 17 is an enlarged side elevational view showing a portion of the tube delivering and releasing means illustrated in Fig. 15;

Fig. 18 is a top plan view of a portion of the device illustrated in Fig. 17;

Fig. 19 is an enlarged view showing portions of the tubing delivering means of Fig. 15;

Fig. 20 is a sectional view taken along line 20—20 of Fig. 18;

Fig. 22 is a top plan view showing a modified form of the invention which may be utilized for forming portions of glass tubes to non-circular shape;

Fig. 23 is a top plan view, partly broken away, illustrating portions of drive means for the modified machine of Fig. 22;

Fig. 24 is a fragmentary vertical sectional view showing the relationship of parts and portions of the drive means illustrated in Fig. 23;

Fig. 25 is an elevational view of means for forming non-circular portions on glass tubes;

Fig. 26 is a vertical sectional view taken along line 26—26 of Fig. 25;

Fig. 26a is an enlarged side view of a portion of the tube shaping means shown in Fig. 26;

Fig. 26b is an enlarged plan view of a portion of the tube shaping means shown in Fig. 26;

Fig. 27 is an enlarged vertical sectional view of a portion of the shaping means illustrated in Fig. 26;

Fig. 28 is an enlarged sectional view taken along line 28—28 of Fig. 27;

Fig. 29 is a fragmentary elevational view, partly in section, showing means for actuating the shaping means of Figs. 25 and 26, means for raising mandrels toward the chucks, and means for shaping portions of glass tubing;

Fig. 29a is a fragmentary view taken along line 29a—29a of Fig. 29; and

Fig. 30 is a fragmentary elevational view showing means for temporarily retaining a mandrel in elevated position.

THE GLASS ARTICLE

Figure 1:
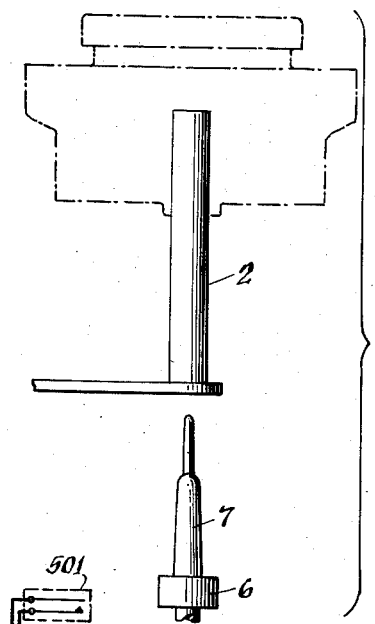
Figure 2:
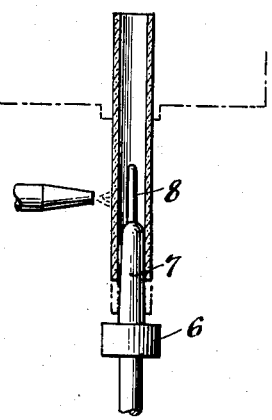
Figure 3:
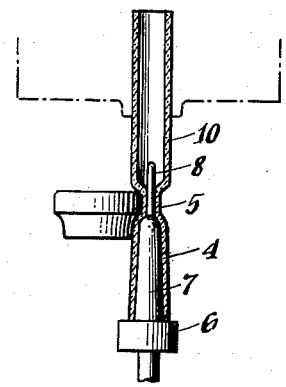

By the present apparatus lengths of substantially cylindrical glass tubing 2 (Fig. 1) are formed into articles having open end portions connected by an integral intermediate portion of reduced cross section. One enlarged portion and the intermediate connecting portions are provided with accurately pre-determined interior cross sectional dimensions. The general shape of the formed article is shown in Fig. 3.

The enlarged portion 4 and the intermediate portion 5 are so formed that their interior walls conform to the exterior dimensions of the mandrel portions 7 and 8. For some sizes of glass articles the reduced mandrel portion 8 may be a tungsten wire of diameter about .075 inch and the mandrel portion 7 may taper from about .298 inch adjacent its upper part to about .320 at its lower part; these are merely examples of dimensions which may be used. The accurately formed tapering portion 4 is adapted to receive and cooperate with portions of an electrical unit to hold the unit firmly in position against movement or vibration, to minimize or prevent microphonics.

Subsequent to insertion of such a unit, the outer end of the portion 4 is closed and sealed together, the conducting wires of the unit extending through the thus sealed glass end. The opposite enlarged portion 10 of the article need not be formed to predetermined interior dimensions as its purpose is to facilitate withdrawal of air from the sealed portion 4 which contains the electrical unit. When the outer or open end of the portion 10 is connected with an exhaust pump (not shown), air may be rapidly withdrawn from the interior of the unit-containing portion 4 through the enlarged portion 10 and the relatively short reduced portion 5. The large cross section provided by the enlarged portion 10 gives a large passageway for quickly withdrawing air and the reduced intermediate section 4 may be quickly closed off to hermetically seal the electrical unit after sufficient air has been exhausted, In a modified form of the invention the glass article portion 4 is provided with a generally rectangular or other non-circular cross section to facilitate fitting into small spaces of electrical equipment.

GENERAL DESCRIPTION

Described generally, the present apparatus comprises a rotatable turret 13 carrying a series of cylindrically spaced chucks 14 for holding lengths of glass tubing during subjection to various forming operations. The turret is intermittently rotated or indexed to present the chucks and tubing to a series of stations where the tubing is reformed from the substantially cylindrical shape of Fig. 1 to the shape indicated in Fig. 3.

At station A (Fig. 4) lengths of glass tubing are delivered to the chucks 14. At stations B and C the tubing is preheated by burners 11 in preparation for subjection to flame jets at stations D and E. At stations D and E flame jets from nozzles 11', 12 are directed against the suspended lengths of glass tubing and the tubing is heated so that it elongates and "necks in" where heated by the jets, the amount of elongation which determines the wall thickness being controlled by a gauging collar 6 on a rotating mandrel. At stations F and G the lengths of glass tubing are further preheated by burners 121 in preparation for accurately forming them against the mandrels at station H. At station H gauging or forming rollers (Figs. 7 and 8) are moved in against the rotating tubing to press the tubing firmly against the mandrels and direct glass down along side portions of the mandrel so as to accurately "fit" the glass to the mandrel. The turret then indexes successively through stations I, J, and K where flame jets 12 are directed against the exterior of the tubing to anneal the glass. At station L the reformed lengths of tubing are removed from the chucks and delivered to chutes for guiding to an adjacent receptacle. At stations B through K the chucks and mandrels are rotated to facilitate reformation of the tubing. At unloading station L and loading station A the chucks and mandrels are at rest. The apparatus and method, together with its operation, will now be described in detail.

Turret and drive mechanism

Figure 4:
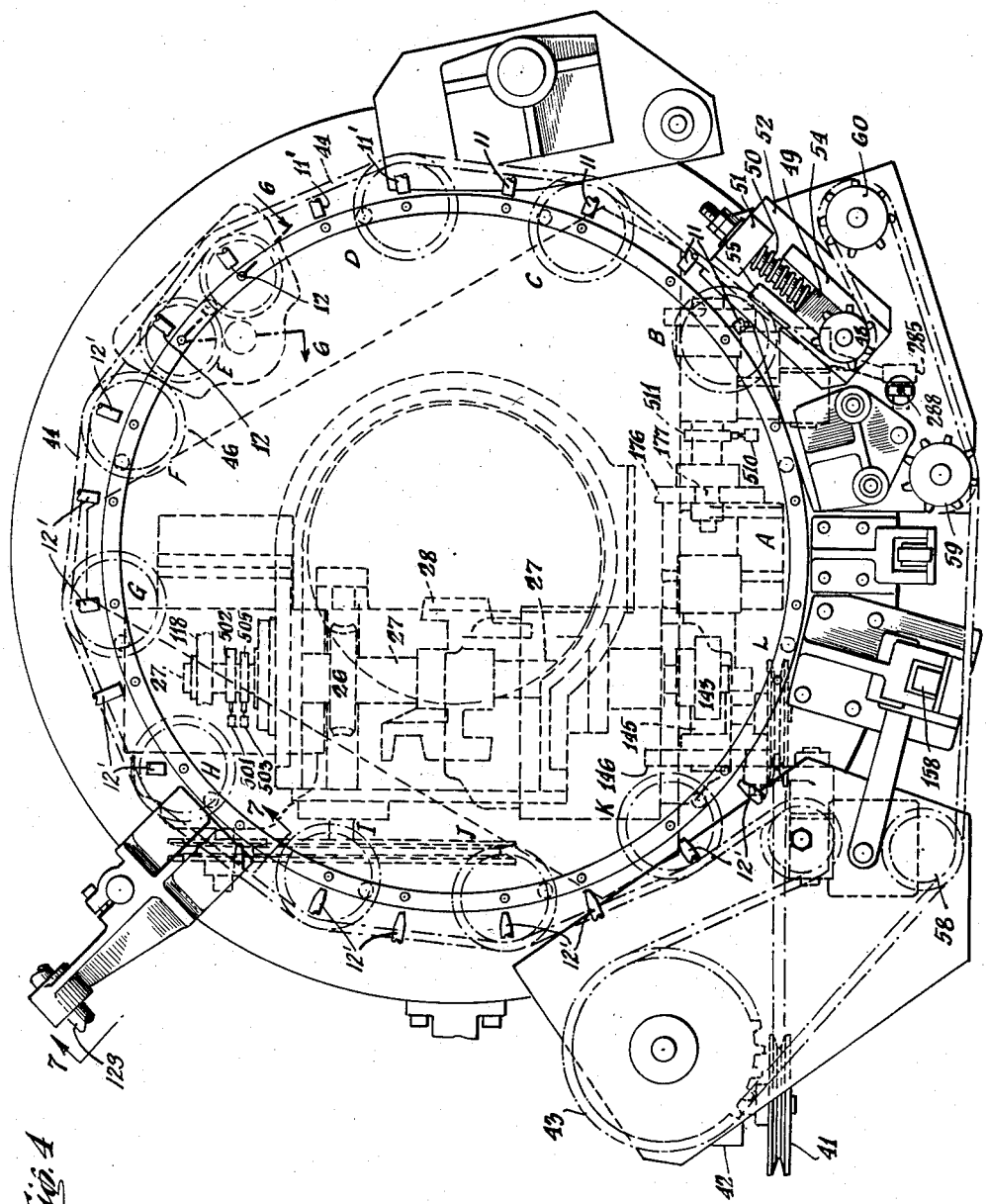
Fig. 4 is a schematic top plan view illustrating the general arrangement of one form of the present machine.
Figure 5:
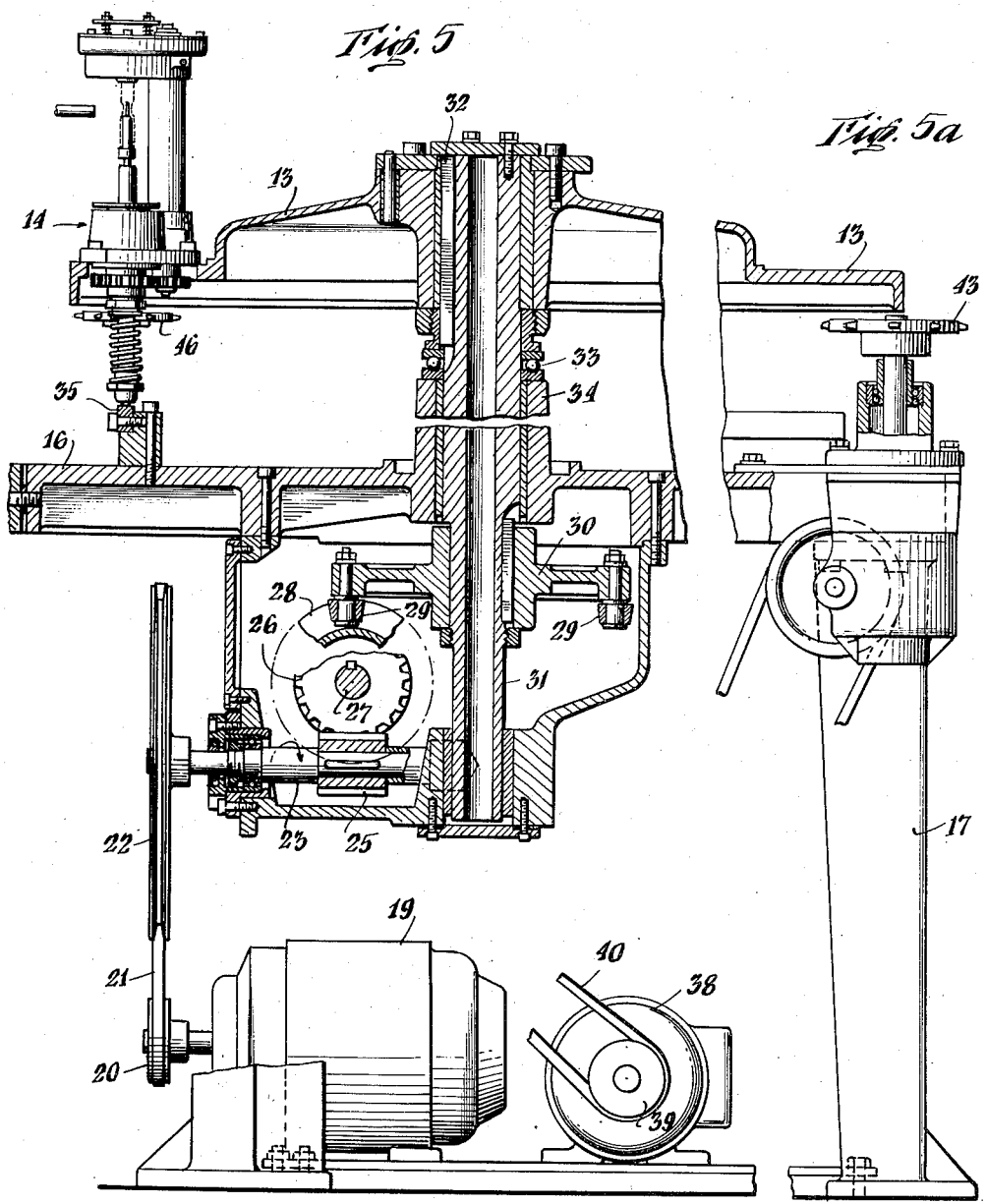
Fig. 5 is a fragmentary vertical sectional view showing means for driving the present machine.

As shown in Figs. 4, 5, and 5a, the machine for practicing the present method comprises a table 16, mounted on legs 17 and carrying the rotatable turret 13 which supports at intervals a plurality of chuck and mandrel units 14. The turret is indexed, to present the chuck and mandrel units to the different stations, by an electric motor 19 through the intermediation of pulley 20, belt 21, pulley 22, drive shaft 23, worm gear 25, worm wheel 26, index cam shaft 27, cam 28 secured to the index cam shaft 27, cam rollers 29 carried by rotatable arm member 30 keyed to upright shaft 31. Upright shaft 31 is secured to turret 13 by a key 32 and hence rotates the turret in response to rotation of the motor 19. A ball type thrust bearing 33 may rotatably support the turret 13 on a central hub 34 of the stationary table 13. Any suitable size or type of motor may be used, for example a one-third or one-half horse power motor of the three phase type turning about 1725 or 1800 R. P. M.

Indexing the turret 13 presents the chucks and mandrel units 14 to the different stations where the lengths of glass tubing are reshaped. A suitable circular cam 35 secured to the upper surface of the table 16 raises and lowers the mandrels and mandrel rods 67.

The various burners or flame jet nozzles located at different stations around the table may be supplied with gas through suitable manifolds (not shown). The gas may be of the ordinary heating variety, or may be combined with oxygen in desired proportions to obtain best heating conditions.

At stations B through K, and while moving from station to station, the chucks and mandrels are rotated by an additional drive motor 38 which may be similar to drive motor 19 through the intermediation of pulley 39, drive belt 40, pulley 41, speed reducing mechanism 42, sprocket 43 and roller chain 44 which engages the sprockets 46 of the various chuck-mandrel units at all stations except unloading station L and loading station A. The drive for the chucks disposed above the various mandrel rods 67 is taken from the rotating mandrel rod, as will be hereinafter brought out.

The drive chain 44 for the chuck-mandrel units may be maintained taut by sprocket 48 carried by yieldably mounted support member 49. The support member 49 is urged toward a portion of the drive chain 44 by spring 50 shown pushing against the movable mounting member 49 and against a fixed portion 51 of a mounting bracket 52. The movable mounting member 49 is guided by spaced guide members 54 and 55 but is urged firmly into contact with the drive chain at all times so as to prevent objectionable slack.

The drive chain 44 is carried by idler sprockets 58, 59 and 60 adjacent the unloading and loading stations L and A in order to space the drive chain from the mandrel sprockets 46 at those stations. Thus the mandrels and chucks are not rotated at the loading and unloading stations.

Chucks and mandrel holders

The chuck and mandrel units shown in connection with Figs. 4 through 21 are of the dual type, one of these dual units being disposed at each of the twelve stations indicated in Fig. 4. A single unit may be used for each station in lieu of the dual type, however, and of course any suitable number of stations may be utilized in lieu of the twelve stations A through L indicated in Fig. 4. The dual type chuck mandrel construction is preferred in some instances as it is relatively simple and gives high production rates.

A preferred dual type chuck and mandrel unit is shown in Fig. 6 and comprises a pair of chucks 62 disposed over and in alignment with a pair of mandrels 63 and mandrel holder shaft 67. Each mandrel comprises an upper portion 65, adapted to form the reduced diameter intermediate portion of an article, secured to a lower portion 66 which is adapted to form a larger unit receiving portion 4 of the glass article. The mandrel portion 66 is in turn secured by a set screw to a rotatable shaft 67, which is in turn secured by a key 68 and keyway 69 to an encircling sleeve 70. The sleeve 70 has a sprocket 71 secured thereto by set screw 72, and is supported by roller bearings 75 within a housing 76 bolted to the turret 13. A cover plate 78 secured to the sleeve 70 projects over a portion of the housing 76 and minimizes the possibility of dirt or broken glass finding its way to bearings 75.

The teeth of the sprocket 71 engage the roller chain 44, which is driven by motor 38 hereinabove referred to. If desired, pulleys could be utilized in lieu of the sprocket 71 and a belt in lieu of the roller chain 44, as will be hereinafter brought out in connection with a modified form of the invention.

Each mandrel shaft 67 is movable up and down through the encircling sleeve 70 to thereby move the mandrel gauging portions 65 and 66 toward and away from the chucks 62. Each mandrel is normally urged downwardly toward a cam track 35 by a spring 80 which bears at one end against a fixed collar 81 and at the other end against a collar member 82 secured to the lower end of the reciprocable mandrel shaft 67.

As the chuck-mandrel units are rotated through the closed path by the turret 13 the mandrel shafts 67 are raised and lowered in accordance by cam 35. Movement of the mandrel shafts over the cam 35 is facilitated by balls 84 carried within sockets 85 at the lower ends of the mandrel shafts.

Rotation of the mandrel sleeve 70 which carries the driving sprocket 71 is transmitted to the adjacent rotatable mandrel sleeve through a gear 86 keyed to the sprocketed sleeve; this latter sleeve is keyed to an inner mandrel shaft similar to that already described. The gear 87 is actually located intermediate the pair of adjacent parallel mandrels 67 of any one unit, as shown in Fig. 4, but for clarity of illustration Fig. 6 is taken along an angular section line and thus appears to be at one side of the mandrel shafts.

The intermediate gear 87 is secured to and rotates an upright shaft 91 which extends through a hollow upright column 92 that in turn supports a chuck housing 93 at its upper end. The chuck housing projects laterally from the hollow column 92 and the central axes of the chucks 62 carried thereby are in alignment with the central axes of the mandrel shaft 67.

Each chuck comprises a rotatable hollow member 95 mounted on roller bearings 96 and carrying a gear 97 that meshes with a drive gear 98 secured to the upper end of the upright chuck driving shaft 91. A central member 100 extends through the outer hollow member 95 and is adapted to receive a length of glass tubing and grip it by laterally movable engaging balls 101 carried in recesses of the central member. Lateral movement of the gripping balls 101 to engage or release a length of glass tubing is achieved by an outer member 102 provided with annular recesses having inclined surfaces 103 for engaging the balls. As shown, when the outer member 102 is moved downwardly the inclined surfaces 103 move away from the balls and the latter may move outwardly into annular recesses adjacent upper portions of the inclines; when the outer member 102 is moved upwardly the inclined surfaces force the balls inwardly to engage the outer periphery of a length of tubing. Inner edges of recesses in the central member 100, which contain the balls 101, are of reduced size so that the balls are retained by the central member 100. The outer member 102 is normally retained in elevated position, to hold the balls at an inner position, by springs 105 which rest against a portion of the rotatable hollow member 95 and urge a cover member 106 upwardly; the cover member 106 is connected with the outer member 102 by bolts 107 that extend through the springs 105 and are threaded into the outer member 102. The cover members 106 are preferably provided with downwardly and inwardly tapering surfaces 108 to facilitate guiding the lower end of a length of glass tubing toward a central position in alignment with the central member 100.

At loading station A mandrels are in a lowered position, due to the balls 84 at the lower ends of the mandrel shafts 67 being in engagement with a lower portion of the cam 35. At this station the chucks are opened by a portion of a vertically movable arm 111 (Figs. 9–11) which moves down into contact with the cover plates 106 of adjacent chucks. In this open relationship the chucks receive vertically disposed lengths of glass tubing which are guided thereinto by generally funnel shaped portions 108 on the chuck cover plates 106. The lengths of tubing drop down through the hollow central members 100 and come to rest against underlying gauging platforms 112, which will be hereinafter described in detail.

The chuck operating arm 111 moves upwardly away from the chuck cover plates 106 prior to indexing of the machine so that the chuck balls 101 may grip the glass tubing. Thereafter, the gauging platforms 112 are moved downwardly slightly out of contact with the lower ends of the gripped tubing. During this period the mandrels are spaced below the lower ends of the inserted tubing.

The turret 13 then indexes and presents the chucks successively to the different stations around the table 16. At stations B and C flames are directed against appropriate portions of the gripped and rotating glass tubes to preheat them in preparation for elongation at stations D and E. The mandrels are preferably raised to fully elevated position prior to reaching stations D and E, so that mandrel collars 6 are in position to limit the extent of elongation and thus wall thickness of the glass tubing during elongation and necking in thereof in response to the flame jets at stations D and E. Raising of the mandrels to their upper position is preferably obtained in two or three steps (not shown) in the cam 35, as this facilitates manufacture of the cam. Similarly, lowering of the mandrels subsequent to reforming at station H may be achieved in two or three steps.

*Preliminary shaping of tubing*

At stations D and E the hot jets of flame directed at the portion of the tubing to be constricted cause the glass to soften and gravity pulls the tubing downwardly until the lowermost end of the glass tube comes into contact with the upper surface of collar 6 on the mandrel, the mandrel now being in elevated position so that it projects at least partially into the lower end of the glass tube and guides it downwardly. As previously brought out, both mandrels and chucks are rotated at stations B through K as well as during movement from station to station; this causes the stationary flame jets to reach all portions of the tubing to uniformly heat it.

The mandrel collars 6 may be set at appropriate elevations to control the amount of elongation of the glass and the amount of constriction and the reduction in glass thickness caused by elongation in response to softening of the glass by the flame jets.

After preliminary forming and gauging of the tubing at stations D and E the chucks and mandrels advance through stations F and G where the glass is preheated in preparation for accurate shaping at forming station H.

*Constricting mechanism*

At station H a roller moves in against each rotating mandrel and length of tubing to accurately form the tubing against the mandrel. This operation is shown more particularly in Figs. 3, 7, and 8. The roller has an upper portion 116a connected by a shoulder 116b with a lower portion 116c. These roller portions conform generally to the profile of adjacent mandrel portions and serving to press the softened glass firmly in against the mandrel portions so that it is shaped to conform substantially to the shape and dimensions of the upper and lower mandrel portions. The shoulder portion 116b tends to direct glass downwardly along side portions of the mandrel so as to "fit" the glass on the mandrel much like a glass being fitted on and shaped to a hand. As previously mentioned the mandrel portion 66 tapers outwardly to form tapering walls at the inside of the enlarged portion 7 of the article for receiving and retaining an electrical unit. During reforming of the glass by the rollers 116 flame jets are directed against the glass to keep it in plastic condition.

Inward and outward movement of the rollers 116 for engaging and disengaging the glass, is obtained (Figs. 4 and 7) by index cam shaft 27, through the intermediation of cam 118, roller 119, crank 120, adjustable connecting rod 121, lever 122 rotatably mounted on shaft 123, reciprocable member 126 rotatably connected with lever 122 through connection 127, and rod 128 which carries the roller 116 adjacent one end thereof. The roller-carrying rod 128 is yieldably urged toward an outer position on reciprocable member 126 by a spring 131, which bears at one end against a collar 132 and at the other end against a cross bar 133; adjustable securing nuts 135 hold the roller rod in position on the reciprocable member 126. Adjacent the outer end a portion of the roller rod is guided by a guide member 137 bolted to the reciprocable member 126.

As shown, a pair of the reciprocable rods with rollers 116 are mounted on the reciprocable member 126. This provides for accurately simultaneously shaping the glass on a pair of mandrels. It will be clear that only a single reciprocable rod may be utilized if desired.

After the rollers 116 accurately shape the glass on the mandrels, the rollers withdraw and the turret indexes the mandrels through a plurality of annealing stations I, J and K, where suitable flame jets are directed against the glass to remove stresses and strains set up during previous heating and forming operations. During movement away from the forming station H, the mandrels are lowered away from the shaped glass portions by having the support balls 84 at the lower ends of the mandrels travel along a descending portion of the cam track 35.

In this mandrel-lowered relationship the turret indexes the chucks to unloading station L, where the accurately internal dimensioned articles are removed from the chucks and discharged.

*Unloading mechanism*

In Figs. 9, 10 and 11 the relationship of the chucks and mandrels is shown with respect to the means for opening the chucks and discharging the completed glass articles. A pair of chucks indexes into position beneath a pair of remover rods 142. The remover rods 142 are vertically reciprocable so that they may be inserted into the upwardly open ends of the shaped articles to frictionally engage them and lift them out of the chucks when the latter are opened; the chucks grip the outer portions of the glass tubes until engaging portions at the lower ends of the remover rods 142 are inserted and engage the shaped articles.

As shown more particularly in Figs. 9, 10 and 4a the remover rods are reciprocated by the index cam shaft 27 through the intermediation of gear 143 on the index shaft which meshes with a meshing gear on cam shaft 145, cam 146 secured to the cam shaft 145, roller 147 which bears against the cam 146 and is carried by lever arm 148 rotatably mounted on support shaft 149, air valve 152 operated by arm 153 that bears against an end portion of lever arm 148, air cylinder 154 connected through conduits 155 and 156 with the air valve 152, piston rod 157 of the air cylinder 154, vertically reciprocable shaft 158 that is guided through bearings 159 of stationary upright member 161 (bolted to the top of the machine table 16), and laterally projecting arm 162. In order to obtain high production rates, the cam 146 operates the air valve 152 so as to admit air to the upper end of the air cylinder 154 prior to the time that a chuck to be unloaded is directly underneath the unloader rods 142; when the chucks are directly under the rods 142 the latter are already part way down.

The lever arm 148 which moves the air valve arm 152 may connect with a spring 164 to urge it in one direction.

The air valve 152 may be of any generally known commercial type, for example, the 4-way type produced commercially by the Schrader Company, and serves to connect the upper or lower ends of the air cylinder 154 with a compressed air supply (not shown) so as to move a cylinder piston up or down to thereby raise or lower the vertically reciprocable rod 158 together with the remover rods 142 carried thereby. As shown in Figs. 9 and 10, air is about to be admitted through valve 152 to the lower end of air cylinder 154 to raise its piston rod 157 together with shaft 158, and thereby lift the remover rods out of the chucks. An air cylinder with about a 2½ inch bore and 9½ inch piston rod stroke is satisfactory in some instances and gives ample vertical movement to the remover rods 142.

A preferred form of arrangement of air valve and air cylinder is shown in 10b, which illustrates how air, which may be at about twenty pounds pressure, may pass through inlet conduit 167 through an adjustable needle valve 168, air filter 169 and inlet conduit 170 to the control valve 152, passing from thence through one or the other of conduits 155 or 156 to the upper or lower ends of the air cylinder 154. A suitable commercially available pressure regulator 171 is preferably utilized to cut off the electric power to the driving motors in the event air pressure for the cylinder 154 drops to too low a value, for example below twenty pounds per square inch. The shaft 158 which reciprocates the remover rods 142 is illustrated having a square cross section passing through correspondingly shaped bearings 159 to thereby maintain the remover rods in correct position for registry with chucks that are at unloading station L.

To provide for frictional engagement of the rod members with remover rods 142 with interior surfaces of the glass articles, the rod members have their lower ends spread outwardly or carry yieldable projections 173. In Fig. 10c there is shown a modified form of remover rod 142 which has resilient means 173c spaced from the lowermost tapered end 174 of the rod. With this rod the lower taper helps guide the rod into the tubing and the yieldable members frictionally engage interior tube walls.

It will be recalled that when the chucks are at unloading and loading stations L and A, neither they nor the mandrel shafts are rotated as the drive chain 44 is led around idler sprockets to space it from the mandrel driving sprockets 46.

When the engaging portions 173 or 173c of the remover rods 142 are inserted into open upper ends of glass articles the chucks are in holding engagement with outer surfaces of the articles, this chuck hold being thereafter released. This releasing of the chuck hold is obtained by portions of the chuck-opening arm 111 moving into contact with the chuck covers 106 and pressing them downwardly in opposition to the chuck closing springs 105. As the cover plate and chuck bolts 107 move the chuck release member 102 downwardly the gripping balls move outwardly to release their grip. The instant at which the chuck actuating arm 111 opens and closes the chucks may be regulated by suitably positioning adjusting bolts 113 carried by the chuck arm 111.

The chuck actuating arm 111 moves up and down in timed relationship in respect to reciprocation of the remover rods 142. This arm movement is obtained (Figs. 9 and 4a) from the same cam shaft 145 which actuates the remover rod shaft 158, through the intermediation of cam 176 on shaft 145, roller 177 carried by operating lever 178 mounted on and rotatable about support shaft 181, and link 182 connected with reciprocable shaft 183 which carries the arm 111 adjacent its upper end. The shaft 183 is preferably provided with a square or other suitable cross section and is guided through spaced bearing portions 185 stationarily mounted on support member 186 secured to the stationary machine table. The arm-carrying shaft 183 is normally urged toward an upper position so that its chuck operating arm is spaced away from the chucks and so that its connected operating lever 178 is urged into contact with the driving cam 176, by springs 188. These springs 188 are shown in Fig. 9 connected at one end with a support member 189 secured to the stationary support bracket 186 and at their other ends to a pin 192 connected with the reciprocable shaft 183.

Articles lifted out of the chucks by the remover rods 142 are stripped from the remover rods as upper ends of the articles come into contact with stripping stops or collars 194 carried by an arm 195, mounted at the upper end of the stationary upright member 161 which supports and guides the rod actuating shaft 158.

A stripped-off article drops onto a deflector member 197 and is guided therefrom to deflector chute 198. The deflector members 197 are normally positioned at one side of the movement path of the remover rods 142 so that the rods may move freely up and down. As the rod actuating shaft 158 raises the remover rods, a cam roller 199 projecting from one side of the shaft 158 contacts a portion of cam 200 located alongside the shaft 158. This cam is swung outwardly about a support shaft 201 and rotates an operating arm 202 connected with the shaft 201.

As the arm 202 moves in response to rotation of the cam 200 it pulls link means 203 and swings the connected deflector members into registry with upper ends of the discharge chutes 198. Deflector members 197 are carried by support links 196 pivotally secured to the laterally projecting arm 195. Upon downward movement of the operating shaft 158 the cam roller 199 moves away from the cam 200, and arms 202, links 203 and deflectors 197 swing clear of the path of remover rods 142.

Glass detector mechanism

Occasionally a glass article may break and part of it drop down around a mandrel portion 66. If this piece of glass is allowed to remain encircling the mandrel it will interfere with delivery of fresh lengths of tubing to the mandrels at loading station A. For this reason means is provided to prevent release of fresh lengths of tubing at the loading station in instances where pieces of glass encircle the mandrels. As shown in Fig. 9a, rollers 205 of electrical switches 206 are located at unloading station L in close proximity to the movement path of the mandrels. If no piece of glass encircles a mandrel, the switch rollers 205 are not actuated. If a piece of glass encircles a mandrel its thickness is sufficient to move the switch rollers 205 slightly away from the mandrels and close the circuit in switches 206, which are electrically connected with a solenoid 207 (Fig. 10a). The solenoid 207 moves its core member and shifts the position of a link member 208 and feed cut-out arm 290 to prevent feeding of fresh lengths of tubing to the broken-glass-carrying mandrel when it has advanced to tubing delivery station A, as will be brought out hereinafter. Any suitable quick acting switch 206 may be utilized, for example various commercially avaliable microswitches.

Tubing support platform

A portion of the same arm 111 that opens the chucks at unloading station L also opens them at loading station A so that fresh lengths of tubing arranged and delivered by an adjacent part of the machine may move into the chucks and onto the referred to tube supporting platforms 112.

These platforms are shown in Figs. 10a, 12 and 13. A pair of upright stationary support members 210 carry means that pivotally supports the platforms 112. The platforms project into the movement path of the chuck and mandrel axes and are carried on a member 211 which is carried by and rotatable about the horizontal axis of support pins 212. A spring 213 connected between upright posts 214 of the member 211 and one of a pair of clamp members 216 normally maintains the block member 211 in such position that its platforms 112 are in the raised position shown in Fig. 13. The platform is in this position when the chucks are open and fresh lengths of glass tubing inserted into the chucks. As the chuck operating arm 111 elevates, the chucks close and their balls grip the inserted tubing.

During raising movement of the operating arm 111 by its actuating shaft 183 an operating extension 217 secured to the shaft 183 by bracket 218 moves up into contact with a projecting arm 220 of the rotatably mounted member 211. This elevates the arm 220 and swings the member 211 about its axis 212 and thereby swings the supporting ends of the platforms 112 downwardly away from the lowermost ends of freshly inserted ends of glass tubing. In this latter position of the platforms 112, the turret again indexes and moves the chucks with freshly inserted tubing to an adjacent upper heating station and moves a previously emptied set of chucks into position over the platforms for insertion of fresh tubing thereto. The recited operations of chuck opening and platform movement are repeated each time an emptied set of chucks indexes into loading position.

The platforms are also free to swing horizontally in the direction of rotation of the turret in the event the lower end of a glass tube should slide over a platform. This flexible mounting is provided by torsion springs 221 which normally press the platforms against stop pins 222, but which allow the platforms to move slightly in the direction of chuck movement with the turret.

Tubing delivery and arranging

The mechanism which arranges fresh lengths of glass tubing and presents them to the chucks is shown more particularly in Figs. 15 through 20. As shown, lengths of tubing are placed in a receptacle 225 so that they rest at one end against a rear wall 224 of the receptacle. The receptacle is supported on a cross shaft 226 which is in turn carried by upright support means 227; the receptacle may be tilted on the cross shaft so that its bottom 228 inclines rearwardly and tubing lengths slope toward and rest against the rear wall 224.

Lengths of tubing move down toward and then along the bottom wall 228 toward means 230 for turning the tubing lengths to generally upright position and presenting them one by one to underlying chucks. The arranging and delivering means 230 is carried on the upright support members 210 referred to in connection with the description of the platforms that initially support the tubing in the chucks.

In operation the receptacle 225 will be filled to some appropriate level with lengths of tubing. Gradual feeding of tubing from the receptacle 225 to the arranging means 230 is obtained by agitator means 232 rotatably supported on one side of the receptacle 225 and movable to and fro to agitate adjacent tubing. The agitating means 232 is swung about a support shaft 234 in response to movement of operating lever 235, through intermediation of shaft 237, link 238, arm 240, shaft 241, arm 242, rod 243 and arm 244 fixedly secured adjacent one end of the cross shaft 234. Operating lever 235 is oscillated by the reciprocable shaft 288. Thus as the operating lever 235 is oscillated about its support shaft 233 the agitator 232 is swung about its shaft toward and away from the lower end of the receptacle 225 to thereby gently agitate adjacent tubing and insure feeding into the adjacent open end of an entrance passageway to the arranging and delivering means 230.

Tubing entering the delivering and arranging means 230 pass over a bottom guide 246 and below a top guide 247. Cooperating "gate" members 250 and 251 carried by and movable with the rotatable cross shaft 241 facilitate feeding a single tube at a time to the channel between the upper and lower guide members 246 and 247. When the cross shaft 241 is turned in one direction, the gate member 251 is moved up clear of the feeding passageway so that a tube previously retained by the gate member 251 is released; in this relationship a projection 250' of the gate member 250 is projected into the feeding passageway to hold back other lengths of tubing. As the shaft 241 is rotated in an opposite direction the projection 250' moves out of the feeding passageway and the gate member 251 moves into the passageway, thereby allowing tubes held by the projection 250' to move one step forwardly so that the leading tube comes to rest against the gate member 251. In this manner oscillation of the shaft 241 releases a single tube for each complete oscillation.

Tubes released by the gate 251 move downwardly through the feeding passageway and onto upper surfaces of longitudinally spaced reciprocable blocks 254, 255 and 256, which comprise portions of a reciprocable release mechanism. The blocks 254, 255 and 256 have their end portions longitudinally spaced from each other and are connected together at one side by laterally extending projections 258 and links 259 and at an opposite side by lateral projections 261 and links 262. As lengths of tubing roll along the upper surfaces of the blocks 254, 255, 256, one length at a time may fall into the spaces between adjacent end portions of the blocks, as indicated by the dot-dash lines of Fig. 18. Lengths of tubing which do not thus drop into the spaces remain supported on the upper surfaces of the blocks. The means comprising the spaced blocks is reciprocable to and fro in channels 267 over a bottom plate 265 having openings 266 therethrough for passage of tubing when the spaces between the ends of the block members 254, 255, 256 are in registry with the openings 266. Thus each time the reciprocable feeder comprising the spaced blocks is disposed so that its spaces are in registry with the openings 266 of the bottom plate 265, lengths of tubing may drop through the openings 266. After release of tubing in this manner the blocks move in an opposite direction over the support plate 265 and additional tubing lengths drop into the feed spaces between the blocks, for subsequent registry with the openings 266. The block members are held down against the support plate 265 by bolts 263 (Fig. 15) which have their heads disposed in guide slots 264.

Release of more than one glass tube at a time through the slots 266, when the block openings 253 align therewith, is prevented by thin separator plates 269 mounted on support blocks 270, and by additional separator plates 272. These separator plates extend over the delivery slots 266 and prevent an upper length of tubing, which may rest against the upper periphery of tubing intermediate the ends of the support blocks, from dropping when the block spaces 253 are aligned with the delivery slots 266.

It is necessary that tubing be presented to the chucks in upright position and this is shown (Fig. 16) achieved by a curved guide plate 274 and "funnel" 275. As tubing falls through the delivery slots 266 it drops against the upwardly disposed surface of guide plate 274 and swings thereabout to generally upright position, being then guided by the funnels 275 downwardly into the underlying chucks 62 and therethrough until the lower end of the tubing comes to rest against the supporting platforms 112.

Reciprocation of the feed blocks 254, 255, 256 along the support member 265 is achieved by rotation of the same cross shaft 233 which actuates the feed agitator 232, an arm 277 being keyed adjacent one end of this cross shaft and having at its opposite end a bifurcated portion 278 fitting about a cross bar 280 which joins the oppositely disposed block members 254.

Oscillation of the cross shaft 233 is obtained (Figs 4a and 15) from cam shaft 145 through the intermediation of cam 282, roller 284 carried by arm 285 rotatably mounted on support shaft 286, and operating shaft 288 that is rotatably connected adjacent its upper end with the oscillatable lever 235. The roller 284 is normally held in contact with the operating cam 282 by a spring 287 secured adjacent one end thereof to an extension 289 of the lever 285, and at its other end to some stationary portion of the machine. An adjusting screw 283 at upper end of shaft 288 provides for obtaining optimum movement of lever 235.

As previously mentioned in connection with the glass detector switches 206 (Fig. 9a), when the switches are actuated to operate the solenoid 207 and move the link 208, delivery of tubing to the chucks is prevented. This is obtained (Fig. 10a and 15) by swinging a cut-out arm 290 toward the operating shaft 288.

The switches 206 operate the solenoid 207 and move the arm toward the shaft 288 while the broken-glass-carrying mandrels are at unloading station L, but this does not interrupt tubing release at loading station A as the cut-out arm moves in against the periphery of a collar 291 on the shaft 288 and does not "lock" the shaft down until delivery is completed to the chucks then at loading station A. When the shaft 288 then moves down to commence another tubing delivery reciprocation, the cut-out arm 290 snaps in over the upper end of the collar and prevents subsequent upward shaft movement to release tubing to the broken-glass-carrying mandrel, which will have advanced to loading station A. Release of the cut-out arm 290, so that tubing may be delivered to "following" chucks and mandrels, is provided by means to be described in connection with the wiring diagram. When the arm 290 is released by the solenoid a spring 293 pulls the arm clear of collar 291.

When the arm 290 is in over the collar 291 the shaft 288 is prevented from moving up in response to the downward pressure exerted by the spring 287 and rod extension 289; thus preventing delivery and arranging of tubing. The spring 287 pulling down on the rod extension 289 presses the collar 291 against the underside of cut-out arm 290; even through "low" portions of the cam 282 may move out of contact with cam roller 284, the spring 287 maintains the collar 291 in this position.

*Electrical controls*

Figure 21:
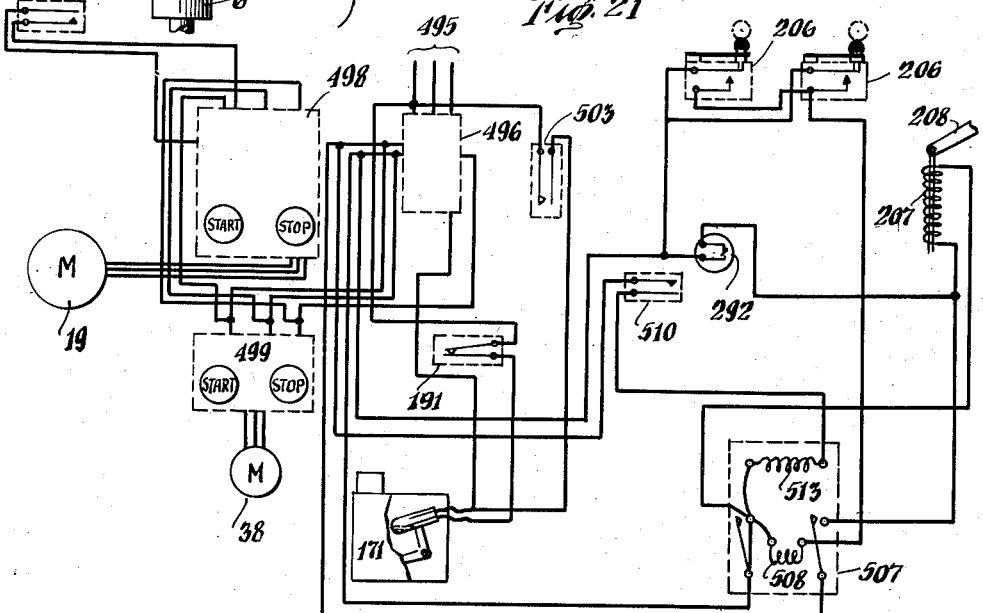
Fig. 21 illustrates the general arrangement of electrical control means and a wiring diagram for the machine.

A diagrammatic arrangement of an electrical system which may be used for the machine is shown in Fig. 21. Current is supplied from power lines 495 to any suitable switch box 496 which is connected by leads with a suitable switch box 498 for controlling the index drive motor 19 and with a switch box 499 that controls the motor 38 which rotates the chucks and mandrels.

The initial switch 496 also connects through leads with the pressure controlled switch 171, which may be of the mercury type mounted on an arm and controlled through linkage so as to complete the circuit when air pressure for moving the piston in the air cylinder 154 is sufficiently high. When the air pressure drops to too low a value, or is shut off, the mercury tube of the switch tilts to interrupt the circuit and stop the machine. When air pressure is sufficient for operating the air cylinder, the switch 171 is actuated so as to close the circuit through the switch 496, by suitable relays therein, and to thus allow current to flow to the switches 498 and 499.

The Stop button of the index motor switch box 498 is operatively connected with an auxiliary switch 501 to prevent stopping the index drive motor 19 while the turret is indexing. When the turret is at an indexed (stationary) position, pushing the Stop button stops the motor 19. The switch 501, which may be any suitable normally open single throw switch, for example a microswitch, is operated by a cam 502 on index cam shaft 27, it serves to cut out the Stop button of the switch 498 while the turret is indexing, but allows the circuit to be interrupted if the Stop button is pressed when the turret is stationary.

The auxiliary switch 501 is desirable due to the fact that the remover rods 142 are actually moving down toward the turret before the turret comes to rest at an indexed position. If the switch 501 did not delay stopping of the index motor 19 until the turret reached an indexed position, the remover rods would be likely to strike the top of the turret and damage the machine. It will be recalled that the remover rods 142 are raised and lowered by the air cylinder 154, which is set into operation by a cam actuating the air control valve 152; once this air valve 152 initiates air delivery to cylinder 154, the downward stroke continues until the rods reach the bottom of their stroke, and hence stopping the index motor 19 intermediate any two indexed positions would not stop descent of the remover rods 142.

Switches 503 and 191 which may be single throw microswitches, are connected with the air pressure controlled switch 171 and with the inlet switch box 496 to stop the machine if the unloader air cylinder 154 should for any reason fail to return to fully raised position. The switch 503 is operated by a cam 505 on index cam shaft 27 and operates in conjunction with the switch 191 (Figs. 9 and 10) which is actuated by a projection 193 on the reciprocating air cylinder shaft 158. In normal operation, the switches 503 and 191 alternate so that at least one is always closed. When both are open, the motors stop. Due to the length of the cam portion which operates the switch 503, both switches will be closed for a period of time.

If raising of the air cylinder rod 158 should be blocked for some reason, its projection 193 would not come into contact with the normally open switch 191 at the upper part of the remover mechanism; as the index cam shaft 27 continues to rotate, it reaches a position where the cam 505 opens the switch 503 and with both switches 503 and 191 open, current to the switch box 496 is interrupted and the drive motor stops.

The foregoing explanation concerning operating switches 191 and 503 assumes that the air pressure is sufficiently high to hold the pressure control switch 171 closed. If this latter switch is open due to the air pressure being excessively low, the machine will stop for that reason.

The mechanism shown at the right side of Fig. 21 is concerned with the glass detector mechanism previously referred to, and stops and starts the glass delivery mechanism in response to pieces of broken glass which may be on a mandrel at the unloading station L. If a mandrel with a piece of glass on it comes into contact with one of the microswitches 206, the glass thickness causes one of the switches 206 to momentarily close. This energizes pull-in coil 508 of the relay box 507 and contact members in the relay move to close the circuit and energize the solenoid 207. Energizing this solenoid 207 moves the lever 208 and pulls the cut-out arm 290 toward the reciprocable shaft 208 which operates the glass delivery mechanism, and into contact with collar 291 therein (Figs. 10a, 15). The cut-out arm 290 rests against this collar until the shaft 208 moves down, in response to cam rotation, far enough for the cut-out arm to move in over the collar. In this relationship, the shaft 208 is held against reciprocation. The collar prevents cutting out glass delivery at the two mandrels which are located at the loading station A in advance of the unloading station L, at which latter station the glass detector switches 206 are located.

With the reciprocable shaft 208 held against movement, fresh lengths of glass tubing cannot feed to those chucks which are disposed above the mandrels with a piece of glass.

When the mandrels with glass on them move away from loading station A a switch 510, which may be single throw normally open of similar construction to switches 501 and 503, is operated by a cam 511 on drive shaft 145 to release the solenoid 207 and let the spring 293 pull the cut-out arm 290 out of alignment with the collar 291. This is achieved by the closing of switch 510 allowing current to pass through the latch release coil 513; energizing the latch release coil 513 opens the switch contact which was previously closed by the pull-in coil 508 and thus flow of current to the solenoid 207 is interrupted, so that the spring 293 may pull the cut-out arm 290 clear of the collar 291. The switch operating cam 511 may be closed 45° and set to match the last portion of feed cam 282.

The relay 507 may be of any suitable known type. This relay requires only momentary impulses to be transmitted to the coils, for example that due to a momentary contact caused by a piece of glass which closes one of the microswitches 206.

The toggle switch 292 is used to energize the solenoid 207 manually, in those instances where it may be desired to prevent feeding of glass to the chucks. This may be during warming up periods of the machine.

*Modified apparatus and operation*

In some instances it is desirable to manufacture the glass articles with a rectangular or other non-circular cross section at one of its enlarged portions. For example, it may be desired to employ a cross sectional glass portion having a configuration such as that shown at 4a in Fig. 28. This generally rectangular section is desired as it facilitates putting a number of parts closer in contact with each other in a small space.

Such a formed article would normally have reduced and enlarged portions 5 and 10 such as shown in Fig. 3, but the portion 4 of the figure would be of non-circular configuration at 4 in Fig. 3.

A modified form of the invention, which may be used to produce articles with non-circular cross section, is shown in Figs. 22 through 30.

As in the preferred embodiment, the structure comprises a turret 295 carrying at angularly spaced intervals a plurality of chuck and mandrel units 296. The turret is intermittently rotated by a drive motor 297 through the intermediation of pulley 298, belt 299, pulley 300, drive shaft 301, meshing gears 302, 303, cam 304, and cam rollers 305 carried at spaced intervals by rotatable member 307 keyed to upright rotatable shaft 308. The shaft 308 is secured by key 310 to the turret 295. Rotation of the turret 295 carries the chuck and mandrel units 296 through a plurality of circumferentially spaced stations where lengths of tubing held by the chucks are subjected to various heating and shaping operations.

At appropriate portions of their movement with the turret the chucks and mandrels are rotated. This is achieved in a manner similar to that already described, namely by a motor 313 through the intermediation of pulley 314, belt 315, pulley 316, speed reducer 318, pulley 319, drive belt 320, and pulleys 322 operatively connected with the mandrel and chuck units 296. If desired, the drive sprockets and chains of the previously described embodiment may be utilized in lieu of the pulleys and belts of the modified form; or the pulley and belt drive may be utilized in lieu of the chain and sprocket drive. A belt tightening device 324 may be used for preventing excessive slack in the drive belt 320.

As the turrent moves the chuck and mandrel units through a closed path and presents them to the various forming stations, means carried by or associated with the stationary table 325 raise and lower the mandrels.

In this form of the invention single chuck and mandrel units are disposed around the turret, in lieu of the dual type. Each of these units includes a chuck device 296a carried at the upper part of a support column 294, through which extends a rotatable drive shaft. The support column 294 and the interior drive shaft are longer than the previously described column 92 and shaft 91 to facilitate presentation of rectangle-forming means or shaping mechanism 328 (Fig. 29) to the space between chucks and mandrels, so that the means 328 which is located at station G may be inserted into the depending open end of a length of glass tubing held by the chucks 296a to give the tubing a non-circular cross section. The rectangle forming means 328 is shown in detail in Figs. 27 and 28 and comprises parts 358 to 362 which will be described hereafter. Rectangle forming means 328 is mounted on bracket 366 as shown in Fig. 26. The rectangle forming means 328 is positioned against the periphery of the turret 295 and the chuck and mandrel units are indexed into and out of position with respect to it. The mandrel 337 is moved into the tubing at station H to further shape the tube as will be more fully explained below.

Lengths of glass tubing are delivered (Fig. 22) to the chucks at loading station A, by a tube presenting and arranging means 331 similar to that shown in Figs. 15 through 20 and previously described above under Tube Delivery and Arranging. A tube supporting platform (in this case only a single platform is utilized as the chucks are of the "single" type and are loaded and unloaded one at a time) similar to those already described is located beneath the chucks and is similarly operated.

After being loaded with lengths of tubing at station A the turret indexes the chucks successively through stations B—F where suitable flame jets are directed against the depending tubing to render them sufficiently plastic.

At station G the drive belt 320 is led away from the drive pulleys 322 and rotation of the chuck-mandrel units 296 is stopped by a stop mechanism 334. At this station, and while held against rotation by the stop mechanism 334, a portion of the shaping mechanism 328 is inserted into the depending end of the heated tubing as is explained in detail below under the heading "Forming Non-Circular Portions" so as to change its shape from circular to rectangular, or other desired shape. For convenience of illustration and description the tubing will be described as being transformed from circular to rectangular shape, but it is to be understood that any other shape may be imparted by a shaping mechanism having appropriately shaped forming members. For example, the end of the tube which is to receive an electronic unit may be made square, oval, etc.

The stop mechanism 334, more fully described below under the heading "Stop Mechanism," stops rotation of the mandrels and chucks in such position that the conforming mandrel-cross-sections are aligned with the configuration to be formed on the glass tubes by the mechanism 328. That is, where a rectangular shape is formed by the shaping mechanism 328, flattened sides on the mandrel are disposed in alignment with the flattened sides of the shaping mechanism 328. Since the mandrels and chucks are simultaneously rotated through interconnecting drive means, the mandrel is therefore always in alignment with the flattened sides formed on the tube at station G.

After being shaped at station G by the shaping mechanism 328 the turret indexes the chucks successively to elevator station H where the mandrels 337 are moved up into the open lower ends of the tubing (by the means described in detail below under the heading "Mandrel Elevator"). Also at about station H the chuck-mandrel drive pulleys 322 come back into driving contact with the encircling belt 320 and again commence rotating.

At stations I, J and K flame jets from suitable burners (not shown) are directed against the tubing to effect elongation and "necking in" as previously described. Elongation and "necking in" to form the reduced intermediate portion of the article continue until the lower end of the elongating tubing comes into contact with the shoulders 338 carried by the mandrels.

At station L a constricting roller moves in against the tubing at the constricted portion and at the downwardly curving shoulder of the mandrel 337. Since single chuck mandrel units are employed, only a single constricting roller is utilized at station L, in lieu of the dual rollers of Figs. 7 and 8.

Here again, the portion of the tubing which projects over the mandrel shoulder is very accurately shaped due to the action of the constricting roller pressing glass firmly down onto the mandrel to thereby insure an accurate fit. The reduced intermediate portion of the glass article is also accurately formed due to the roller portion which presses the glass in against the needle-like mandrel projection.

At stations M, N, O, flame jets are directed against the glass tubing to anneal it, and during movement through these stations, the mandrel may be lowered away from the chucks 296a and tubing by a descending cam track (not shown) along which travels a roller 340 of the mandrel shaft.

At unloading station P, and adjacent loading station A, the mandrel pulleys 322 are out of contact with the drive belt 320 and hence not rotating. At this station the chucks are opened and the formed lengths of tubing drop onto deflecting chutes similar to those indicated by reference character 198 of Fig. 10, but which in this instance project beneath the lowermost ends of the depending tubing. The non-circular configuration of the tubing shaped by the modified form of the machine make it advisable to release the tubes from the bottom of the chucks, rather than lifting them up through the chucks as previously described.

Simultaneous opening and closing of the chucks at the unloading and loading stations P and A may be achieved by a chuck release arm 342 and shaft 343 similar to that already described.

Stop mechanism

The stop mechanism 334 which interrupts rotation of the mandrels and chucks at station G where non-circular portions are formed on the tubing, cooperates with one or more depending pins 345 carried by the chuck pulleys 322. As the spinning mandrel-chuck units move into registry with the stop means 334, one of the depending pins 345 comes into contact with a rotatably mounted arm 347 of the stop mechanism and the mandrel and its interconnected chuck are brought quickly to a stop. The rotatable arm 347 is connected with a reciprocable rod 348 around which extends a spring 349; the spring abuts at one end against a shoulder on the pin 349 and at its other end against a fixed boss 350 secured to a bracket 352 of the stop mechanism. Compression of spring may be regulated by adjustable nuts 354. The spring mounting absorbs the shock of the depending pins 345 which rotate quickly into contact with the stop arm 347.

The mandrel pin 337 on which a tubing is shaped may be held in position on the mandrel holder shaft 339 by set screws or nuts and is so oriented with respect to the mandrel stop pins 345 that when a stop pin is in contact with the stop arm 347, the flat sides or other non-circular portions of the mandrel pin 337 are substantially in registry with corresponding portions of the overlying mechanism 328 which forms the particular non-circular portion on a length of tubing held by a chuck 296a. In this manner the mandrel is so disposed with respect to a non-circular shape formed on the tubing that when elevated, it moves readily into registering non-circular portions of the tubing.

Forming non-circular portions

When the chuck and mandrel unit is brought to rest by the stop mechanism 334, the means for transforming the tubing from circular to non-circular shape moves up into the tubing. This mechanism is shown more particularly in Figs. 25–29. A pair of radial movable spreader members 358 move up into the lower part of the depending tubing and thereafter a spreader pin 359 moves up between the spreader members 358 and pushes them apart so as to force opposite walls of the tubing apart. The spreader members 358 project upwardly from base portions 360, which are normally pulled toward each other by a snap ring 361. Excessive outward movement of the spreader member portions 360 is prevented by an annular plate 362 which rests against the portion 360 and limits their separation. In Fig. 27 the spreader pin 359 is shown forced to an elevated position between the spreader members 358. When the spreader members are first inserted into the glass tubing the spreader pin 359 is at a lower position so that the maximum exterior dimension across the spreader portions is such that they move readily into the tubing.

The spreader members 358 are shown (Figs. 26 and 26a) operatively connected with a vertically reciprocable shaft 365 through bracket 368. The spreader pin 359 is carried by a hollow shaft 370 (which encircles the shaft 365) through the intermediation of adjustable support member 372, arm 373, bracket 374 projecting from adjustment collar 375, and threaded adjusting rings 376 which are screwed onto a threaded portion 378 of the hollow shaft 370. Relative rotation between the central shaft 365 and encircling hollow shaft 370 is prevented by a guide member 380 bolted to the central shaft 365 and projecting through slots in the hollow shaft 370 and stationary support member 381 that is bolted to the stationary table of the machine.

The outer sleeve 370 is normally urged toward a lowered position with respect to the central shaft 365 by a spring 383 which bears at one end against shoulder 384 of the hollow shaft 370 and at its other end against a shoulder of sleeve 385 fixedly positioned with respect to the central shaft 365. In this manner the shafts are relatively reciprocable with respect to each other; when movement of the central shaft stops, the outer shaft may continue to move along the inner shaft, so as to compress the intermediate spring 383. In operation, when the shafts are both initially elevated, the spreader pin 359 is at a retracted position with respect to the insertable spreader members 358 and the spreader members are pulled close to each other by the snap ring 361. The central shaft and sleeve move up together and the spreader members are inserted into the open end of the depending tubing. The spreader pin correspondingly moves with its supporting hollow shaft 370 and this hollow shaft moves in correspondence with the central shaft 365. As both these shafts elevate, control rods 388, connected adjacent their upper ends with a projection 389 of the central shaft are correspondingly elevated. When elevation has reached a certain point shoulder portions 390 on the control rods 388 come into contact with a stationary projecting stop member 392 carried by the stationary support bracket 381. The contact of the control rod shoulders 390 with the stop member 392 stops further upward movement of the central shaft 365 and the spreader members 358. The outer hollow shaft 370, however, continues to move upward and compresses the spring 383; this moves the spreader pin 359 up between the spreader members 358 and forces them outwardly.

Upon downward movement of the hollow shaft 370, it continues to lower until the spring 383 is expanded and the spreader pin 359 withdrawn, thereafter the snap ring pulls the spreader members together and the central shaft 365 moves down and withdraws the spreader members 358 from the tubing.

Raising and lowering the shafts, so as to operate the spreader members and pin, is achieved by index cam shaft 306 through the intermediation of cam 394 secured to the index cam shaft, cam roller 395, lever arm 397 rotatably supported on shaft 398, link 399 and roller 400 which encircles and is secured to the lower portion of hollow shaft 370.

The amount of elevation of the central shaft 365 and hence the amount of insertion of the spreader members 358 into a length of tubing, may be controlled by appropriately positioning the stop member 392 along the length of the central shaft 365. This may be obtained by shifting the position of adjustment nuts 401 threaded to a fixed portion of the support means 381.

Downward movement of the hollow shaft 370 along the central shaft 365 may be limited by collar member 369 which encircles central shaft 365 and is held thereon by lock nuts 371.

The position of the spreader pin 359 on its supporting shaft 370 may be adjusted by shifting the position of the adjustment nuts 376 which support the adjustment collar 375.

Means is provided adjacent the upper part of the central shaft 365 for shifting the lateral portions of the spreader members 358 and spreader pin 359 to provide accurate alignment with the chucks 296a and tubing held by them. As shown in Figs. 25 and 26 movement of the spreader members 358 radially of the machine is obtained by a threaded shaft 404 which is screwed into and extends through a projection 405 of a bracket 406, which is secured to a bracket 366 that supports the spreader members. The bracket member 406 has a recessed portion which fits over and is guided by a retaining portion 407 which has inwardly tapering retaining walls.

A similar mechanism is provided for adjusting the position of the spreader members in a direction generally at right angles to that provided by the adjusting screw 404. This is shown provided by threaded adjusting screw 410 which is threaded through a retaining projection 411 and connected adjacent its opposite ends with a support bracket 412 which carries the adjusting mechanism of the preceding paragraph.

The spreader pin 359 moves laterally simultaneously with the spreader members 358. The spreader pin 359 is secured by set screw 414 to a support member 372 and this latter member is provided with apertures through which extend depending connecting pins 416. The depending pins 416 are secured to the same bracket 366 which carries the spreader members 358 and hence movement of this bracket 366 laterally shifts the spreader pin member 372. The support member 372 has projections 417 that project through slots 418 of the support arm 373; these projections 417 are free to move lengthwise or transversely of the slots 418 and hence laterally shifting the position of the spreader members 358 correspondingly shifts the spreader pin.

Mandrel elevator

Subsequent to leaving station G where non-circular shape is imparted to the tubing, the tubing is presented to a number of stations where flame jets are directed against the tubes to cause necking in and elongation due to gravity. At these stations the mandrel preferably projects into the tubing and its shoulder portion 338 cooperates in controlling the necking in and elongation of the tubing.

Raising of the mandrels into the tubing, after leaving the forming station G, may be obtained by a cam track portion which would raise the mandrel extension shafts 339. However, it is preferred to quickly elevate the mandrels after they leave the forming station G, and as shown this is provided at station H by an elevator mechanism. As the mandrel shafts 339 are presented to elevator station H they move into registry with and rest against the upper end of a vertically reciprocable rod 422, which in this lower position is in alignment with the lower cam track portion 423. The elevator rod 422 then moves upwardly and lifts the lower end of the mandrel shaft 339 into substantial alignment with the raised cam track portion 424.

Raising and lowering of the elevator rod 422 is achieved from the index cam shaft 306 through the intermediation of cam 426 secured to the index cam shaft, cam roller 427 carried by arm 428 of lever 429 (rotatably supported on shaft 431), and connection 432 which projects into slots 434 adjacent one end of the lever member 429. In its raised position on the upper end of elevator rod 422 the lower end of the mandrel shaft 339 is spaced slightly from the adjacent end of the raised cam track 424, so that upon indexing of the turret 295 from station H the lower end of the mandrel rod will move over the raised cam track.

The mandrel 339 is held in elevated position, while the index cam shaft 306 continues to rotate and lowers the elevator rod 422, by what will be referred to as an "interlock" mechanism. This mechanism comprises (Figs. 29 and 30) an auxiliary supporting platform 437 which moves under a collar 341 of the mandrel shaft when the latter is elevated and which holds the mandrel shaft up so that the elevator rod 422 may move downwardly to receive the next mandrel shaft.

The auxiliary platform 437 is carried by a lever arm 438 which is rotatably supported on shaft 440 carried by bracket 441 bolted to the upper surface of the stationary table. The lever arm 438 is rotated back and forth about its supporting shaft through connecting link 443 secured to slotted member 444. The slot in member 444 has projecting thereinto a bushing and bolt 445 which is secured to an auxiliary arm 447 bolted to the lever arm 429 which raises and lowers the elevator rod 429. When the lever arm 429 raises the elevator rod 422 it correspondingly swings the auxiliary arm 447 upwardly until the bushing 445 comes into contact with a shoulder at the upper end of the slot in the member 444; this occurs when the lower end of the mandrel shaft 339 is elevated and in this relationship the lever arm 438 swings its platform 437 under the mandrel shaft shoulder 341.

In the mandrel supporting relationship shown in Figs. 29 and 30, a retaining ball 448 is pressed into a recess 449 of the lever arm 438, by a spring 450 so as to releasably hold the lever and auxiliary platform.

As the elevator operating lever 429 moves downwardly to lower the elevator rod, the auxiliary arm 447 and its bolt 445 move downwardly in the slot of member 444. This movement continues until the bolt and its bushing come into contact with the end of adjustable screw 451 at the lower end of the slotted member 444. Pressure of the bolt and bushing against this adjustment screw pulls the slotted member 444 and connecting link 443 downwardly so as to swing the rotatable lever 438 about its rod 440 and move the auxiliary platform 437 outwardly from beneath the mandrel shoulder 341. When this occurs the turret will have indexed sufficiently far to position the lower end of the mandrel extension 339 over the elevated cam track portion 434, and a succeeding mandrel shaft 339 over the end of elevator rod 422. The screw 451 may be adjusted so as to vary the instant at which the auxiliary platform 437 is swung out from beneath the mandrel shoulder 341.

The turret 295 now indexes the mandrel and chuck units through stations I, J, and K, where flame jets are directed against the tubing to melt it so that it may neck in and elongate as already described in connection with the preferred embodiment.

Constricting mechanism

At station L the chucks and mandrels present the lengths of glass tubing to a forming roller 454, which is moved into and out of contact with the exterior of the rotating tubing to accurately shape the necked-in portion against the "needle" portion of the mandrel and to press downwardly extending portions of the tubing firmly against the adjacent shoulders of the mandrel and also firmly down into contact with the adjacent side portions of the mandrel, which it will be recalled preferably taper downwardly slightly from the shoulder portion so as to facilitate engagement with the retaining discs of an electrical unit subsequently inserted therein.

Only a single forming roller is shown in Figs. 22 and 29 in lieu of the dual mechanism previously described, due to the fact that single mandrel and chuck units are presented to the successive stations.

Movement of the forming roller 454 into and out of contact with glass on the mandrel is obtained from the index cam shaft 306 through cam 457, roller 458 of roller arm 459 secured to shaft 431, lever arm 461 also secured to shaft 431, link member 461, bell crank 464 which extends about connecting pin 465 of reciprocable member 467, and roller-supporting rod 468. The reciprocable member 467 is mounted on and slidably back and forth along bracket 470. A spring 471 normally urges the roller carrying rod 468 toward the mandrel movement path and provides a yieldable mounting. The bracket 470 which carries the forming roller mechanism is in turn carried by a vertically adjustable shaft 474 which may be clamped in adjusted position by clamp 475. When the clamp 475 is loosened, the roller mechanism may be adjusted to suitable height by turning the adjusting screw 476 which is threaded into some suitable stationary portion of carrying bracket 477.

The spring 479 connected at one end with the roller operating lever 461 and at its other end with a stationary portion of the machine maintains the cam roller 458 in contact with the operating cam 457. Subsequent to leaving constricting station L the chucks and mandrels are indexed successively through stations M, N, O, where flame jets play against the tubing to anneal it.

At station P the chucks are opened for removal of the shaped glass lengths. In this instance the glass is preferably not lifted up through the open chucks but drops down onto a deflecting chute similar to the chute 198 illustrated in Figs. 9 and 10. In this instance, however, the inner end of the chute projects beneath the movement path of the chucks and beneath the lower end of the depending tubing so that they may drop onto the chutes and be guided away from the machine.

Opening and closing of the chucks at unloading station P, as well as at loading station A, is by the vertically reciprocable arm 342, which overlaps the chucks and comes into contact with their upper portions so as to open them upon downward movement.

The means 331 of the modified machine for presenting fresh lengths of tubing to the chucks may be operated from the index cam shaft 306 through cam 481, which is mounted on shaft 485; the shaft 485 also is secured to an arm 487 which is in turn connected with a generally vertically reciprocable operating shaft 288a. The shaft 288a operates the tubing presenting device in a manner similar to that already described.

The shaft 343 which carries the chuck release arm 342 may be reciprocated from the index cam shaft 306 through the intermediation of cam 490, roller 491 on arm 492, and arm 493 which connects with the lower end of the reciprocable shaft 343.

It will be seen that the present invention provides a new and improved apparatus for producing tubular glass articles having accurately predetermined internal dimensions. The articles are very accurately and uniformly shaped at an enlarged portion so that they will firmly and accurately engage with mica discs or other retaining members of electrical units, to thereby minimize or prevent microphonics when the completed device is installed in electrical equipment. This enlarged portion connects with a reduced diameter portion which has a uniform bore and wall thickness which facilitates automatic tipping off by an automatic exhaust machine after air has been withdrawn from the enlarged closed ended portion. The enlarged air withdrawing portion of the article provides a large diameter passageway through which air may be quickly drawn during evacuation thereof from the sealed enlarged portion of the article.

The machine is fully automatic in operation and is capable of turning out the improved glass articles at rates of about 2,000 per hour, all accurately and uniformly internally dimensioned so that electrical units may be readily inserted into and retained by them.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, what I claim is:

1. In a glass shaping machine having a horizontal rotatable turret to present cylindrical glass tubes to a plurality of stations and to reshape the glass tubes into articles having intermediate their ends a reduced intermediate zone of accurately predetermined internal dimension integral at one end thereof with an enlarged portion having tapering walls of accurately predetermined internal dimensions and integral at the opposite end thereof with an additional enlarged portion, article shaping means comprising the combination of a chuck carried by the turret having a glass tube retaining passageway, a mandrel holder carried by the turret and spaced beneath and in alignment with said passageway to support a mandrel for engaging a glass tube retained by said chuck in the passageway, a mandrel mounted vertically in said holder having an upper portion of relatively small cross section corresponding to the internal dimensions of the intermediate zone of the glass article and a flaring lower portion corresponding to the internal dimensions of said first enlarged portion of the glass article, means to move the mandrel holder upwardly to a position at which the mandrel is spaced a predetermined distance from the glass tube walls, means adjacent to said turret to heat the glass tube intermediate its ends whereby its intermediate portion necks in and its lower portion flows onto the lower portion of the mandrel, and shaping means adapted to engage the tube at its heated intermediate necked-in portion to force the intermediate portion against the upper portions of the mandrel to thereby form the intermediate zone of the article with predetermined internal dimensions in accordance with the mandrel shape and with predetermined wall thickness determined by the spacing between the shaping means and the mandrel.

2. In a glass shaping machine having a horizontal rotatable turret to present cylindrical glass tubes to a plurality of stations and to reshape the glass tubes into articles having intermediate their ends a reduced intermediate zone of accurately predetermined internal dimension integral at one end thereof with an enlarged portion having tapering walls of accurately predetermined internal dimensions and integral at the opposite end thereof with an additional enlarged portion, article shaping means comprising the combination of a chuck carried by the turret having a glass tube retaining passageway, a mandrel holder carried by the turret and spaced beneath and in alignment with said passageway to support a mandrel for engaging a glass tube retained by said chuck in the passageway, a mandrel mounted vertically in said holder having an upper portion of relatively small cross section corresponding to the internal dimensions of the intermediate zone of the glass article and a flaring lower portion corresponding to the internal dimensions of said first enlarged portion of the glass article terminating at its lower end in a collar member, means to move the mandrel holder upwardly to a position at which the mandrel is spaced a predetermined distance from the tube walls and in which the collar is a predetermined distance from the bottom of the glass tube bottom, means adjacent to said turret to heat the glass tube intermediate its ends whereby its lower portion flows onto the lower portion of the mandrel with its bottom abutting said collar, and shaping means adapted to engage the tube at its heated intermediate portion to force the intermediate portion against the upper portion of the mandrel to thereby form the intermediate zone of the article with predetermined internal dimensions in accordance with the mandrel shape and with predetermined wall thickness determined by the spacing between the shaping means and the mandrel.

3. The shaping machine as defined in claim 2 which further comprises a tube shaping mechanism positioned adjacent to said turret in advance of said mandrel moving means, said shaping mechanism comprising a pair of elongated spreader members adapted for insertion within the glass tube, means to spread the spreader members apart to stretch the glass tube walls, and means to raise and lower the spreader members into and out of the glass tube, respectively.

4. The shaping machine as defined in claim 3 in which said means to spread said spreader members comprises a tapered spreader pin movably mounted for reciprocal motion longitudinally of and between said pair of spreader members.

5. In a glass shaping machine having a horizontal rotatable turret to present cylindrical glass tubes to a plurality of stations and to reshape the glass tubes into articles having intermediate their ends a reduced intermediate zone of accurately predetermined internal dimension integral at one end thereof with an enlarged portion having tapering walls of accurately predetermined internal dimensions and integral at the opposite end thereof with an additional enlarged portion, article shaping means comprising the combination of a chuck rotatably mounted on the turret having a glass tube retaining passageway, a mandrel holder rotatably mounted on the turret and spaced beneath and in alignment with said passageway to support a mandrel for engaging a glass tube retained by said chuck in the passageway, drive means operatively connected to said chuck and to said mandrel to rotate them in synchronism, a mandrel mounted vertically in said holder having an upper portion of relatively small cross section corresponding to the internal dimensions of the intermediate zone of the glass article and a flaring lower portion corresponding to the internal dimensions of said first enlarged portion of the glass article, means to move the mandrel holder upwardly to a position at which the mandrel is spaced a predetermined distance from the glass tube walls, means adjacent to said turret to heat the glass tube intermediate its ends whereby its intermediate portion necks in and its lower portion flows onto the lower portion of the mandrel, and shaping means adapted to engage the tube at its heated intermediate necked-in portion to force the intermediate portion against the upper portions of the mandrel to thereby form the intermediate zone of the article with predetermined internal dimensions in accordance with the mandrel shape and with predetermined wall thickness determined by the spacing between the shaping means and the mandrel.

6. The shaping machine as defined in claim 5 in which said shaping means comprises a roller mounted for rotation in a horizontal plane and having its edge shaped with a shape complementary to the shape of the reduced intermediate zone of the glass article.

7. The shaping machine as defined in claim 6 in which said roller is movably mounted for reciprocal motion toward and away from said mandrel, said roller being operatively connected to a cam means whereby the minimum spacing of the rollers from the mandrel is set at a predetermined distance by said cam to control the thickness of the glass tube wall at the reduced intermediate zone of the glass article.

8. In a glass shaping machine having a horizontal rotatable turret to present cylindrical glass tubes to a plurality of stations and to reshape the glass tubes into articles having intermediate their ends a reduced intermediate zone of accurately predetermined internal dimension integral at one end thereof with an enlarged portion having tapering walls of accurately predetermined internal dimensions and integral at the opposite end thereof with an additional enlarged portion, article shaping means comprising the combination of a chuck carried by the turret having a glass tube retaining passageway, a mandrel holder carried by the turret and spaced beneath and in alignment with said passageway to support a mandrel for engaging a glass tube retained by said chuck in the passageway, a glass tube positioning means adjacent to said turret having a tube engaging member adapted to removably engage a tube in the chuck passageway to position it with respect to said mandrel holder, a mandrel mounted vertically in said holder having an upper portion of relatively small cross section corresponding to the internal dimensions of the intermediate zone of the glass article and a flaring lower portion corresponding to the internal dimensions of said first enlarged portion of the glass article terminating at its lower end in a collar member, means to move the mandrel holder upwardly to a position at which the mandrel is spaced a predetermined distance from the tube walls and in which the collar is a predetermined distance from the bottom of the glass tube bottom, means adjacent to said turret to heat the glass tube intermediate its ends whereby its lower portion flows onto the lower portion of the mandrel with its bottom abutting said collar, and shaping means adapted to engage the tube at its heated intermediate portion to force the intermediate portion against the upper portion of the mandrel to thereby form the intermediate zone of the article with predetermined internal dimensions in accordance with the mandrel shape and with predetermined wall thickness determined by the spacing between the shaping means and the mandrel.

9. In a glass shaping machine having a horizontal rotatable turret to present cylindrical glass tubes to a plurality of stations and to reshape the glass tubes into articles having intermediate their ends a reduced intermediate zone of accurately predetermined internal dimension integral at one end thereof with an enlarged portion having tapering walls of accurately predetermined internal dimensions and integral at the opposite end thereof with an additional enlarged portion, article shaping means comprising the combination of a chuck rotatably mounted on the turret having a glass tube retaining passageway, a mandrel holder rotatably mounted on the turret and spaced beneath and in alignment with said passageway to support a mandrel for engaging a glass tube retained by said chuck in the passageway, a glass tube positioning means adjacent to said turret having a tube engaging member adapted to removably engage a tube in the chuck passageway to position it with respect to said mandrel holder, a mandrel mounted vertically in said holder having an upper portion of relatively small cross section corresponding to the internal dimensions of the intermediate zone of the glass article and a flaring lower portion corresponding to the internal dimensions of said first enlarged portion of the glass article terminating at its lower end in a collar member, means to move the mandrel holder upwardly to a position at which the mandrel is spaced a predetermined distance from the tube walls and in which the collar is a predetermined distance from the bottom of the glass tube bottom, means adjacent to said turret to heat the glass tube intermediate its ends whereby its lower portion flows onto the lower portion of the mandrel with its bottom abutting said collar, drive means operatively connected to said chuck and to said mandrel to rotate them in synchronism, and shaping means adapted to engage the tube at its heated intermediate portion to force the intermediate portion against the upper portion of the mandrel to thereby form the intermediate zone of the article with predetermined internal dimensions in accordance with the mandrel shape and with predetermined wall thickness determined by the spacing between the shaping means and the mandrel.

10. The shaping machine as defined in claim 9 in which said shaping means comprises a roller mounted for rotation in a horizontal plane and having its edge shaped with a shape complementary to the shape of the reduced intermediate zone of the glass article.

11. The shaping machine as defined in claim 9 which further comprises a tube shaping mechanism positioned adjacent to said turret in advance of said mandrel moving means, said shaping mechanism comprising a pair of elongated spreader members adapted for insertion within the glass tube, means to spread the spreader members apart to stretch the glass tube walls, and means to raise and lower the spreader members into and out of the glass tube, respectively.

12. The shaping machine as defined in claim 10 in which said roller is movably mounted for reciprocal motion toward and away from said mandrel, said roller being operatively connected to a cam means whereby the minimum spacing of the roller from the mandrel is set at a predetermined distance by said cam to control the thickness of the glass tube wall at the reduced intermediate zone of the glass article.

13. The shaping machine as defined in claim 11 in which said means to spread said spreader members comprises a tapered spreader pin movably mounted for reciprocal motion longitudinally of and between said pair of spreader members.

References Cited in the file of this patent

UNITED STATES PATENTS

| | | |
|---|---|---|
| 650,433 | Stewart | May 29, 1900 |
| 959,454 | Campbell | May 31, 1910 |
| 1,041,329 | Mygatt | Oct. 15, 1912 |
| 1,024,116 | Burrows | Apr. 23, 1916 |
| 1,425,606 | Quackenbush | Aug. 15, 1922 |
| 1,501,773 | Headley | July 15, 1924 |
| 1,914,205 | Hooper et al. | June 13, 1933 |
| 1,981,692 | Dichter | Nov. 20, 1934 |
| 1,999,525 | Morscholz | Apr. 30, 1935 |
| 2,022,786 | Schwab | Dec. 3, 1935 |
| 2,022,939 | Miller | Dec. 3, 1935 |
| 2,185,704 | Donovan et al. | Jan. 2, 1940 |
| 2,195,483 | Franke | Apr. 2, 1940 |
| 2,215,041 | Hostetter | Sept. 17, 1940 |
| 2,241,455 | Gantzer | May 13, 1941 |
| 2,266,417 | Eisler | Dec. 16, 1941 |
| 2,284,089 | Hahn et al. | May 26, 1942 |
| 2,286,401 | Everett | June 16, 1942 |
| 2,312,003 | Schneider et al. | Feb. 23, 1943 |
| 2,357,501 | Carnahan | Jan. 7, 1944 |
| 2,368,170 | Smith | Jan. 30, 1945 |
| 2,413,960 | Eisler | Jan. 7, 1947 |
| 2,447,522 | Moscrip | Aug. 24, 1948 |
| 2,503,140 | Stookey | Apr. 4, 1950 |
| 2,595,077 | Hughes et al. | Apr. 29, 1952 |
| 2,596,899 | Kahle | May 13, 1952 |
| 2,683,331 | Eisler | July 13, 1954 |
| 2,684,556 | Molinari | July 27, 1954 |